(12) United States Patent
Pettigrew

(10) Patent No.: US 6,571,012 B1
(45) Date of Patent: May 27, 2003

(54) ADJUSTING A SOFTNESS REGION

(75) Inventor: Daniel Pettigrew, Montreal (CA)

(73) Assignee: Autodesk Canada Inc., Quebec (CA)

( * ) Notice: Subject to any disclaimer, the term of this patent is extended or adjusted under 35 U.S.C. 154(b) by 0 days.

(21) Appl. No.: 09/282,659

(22) Filed: Mar. 31, 1999

(30) Foreign Application Priority Data

Apr. 1, 1998 (GB) .............................................. 9806976

(51) Int. Cl.$^7$ ................................................. G06K 9/00
(52) U.S. Cl. ...................................... 382/167; 348/592
(58) Field of Search .............................. 382/162–167; 358/500–540; 348/584–592

(56) References Cited

U.S. PATENT DOCUMENTS

| | | | | |
|---|---|---|---|---|
| 5,130,789 A | * | 7/1992 | Dobbs et al. ................ | 358/500 |
| 5,301,016 A | | 4/1994 | Gehrmann | |
| 5,347,622 A | | 9/1994 | Takemoto et al. | |
| 5,355,174 A | * | 10/1994 | Mishima ..................... | 348/592 |
| 5,455,633 A | | 10/1995 | Gehrmann | |
| 5,625,378 A | * | 4/1997 | Wan et al. ................... | 345/600 |
| 5,630,037 A | * | 5/1997 | Schindler .................... | 382/283 |
| 5,719,640 A | | 2/1998 | Gehrmann | |
| 5,838,310 A | * | 11/1998 | Uya ............................ | 348/587 |
| 5,887,082 A | * | 3/1999 | Mitsunaga et al. ......... | 382/199 |
| 6,175,663 B1 | * | 1/2001 | Huang ......................... | 382/284 |

FOREIGN PATENT DOCUMENTS

| | | | | |
|---|---|---|---|---|
| EP | 0735 511 A2 | 10/1996 | ........... | G06T/11/00 |
| EP | 0776136 A1 | 5/1997 | | |
| FR | 2681967 | 4/1993 | ........... | G06F/15/66 |
| GB | 2262860 A | 6/1993 | | |
| GB | 2270439 A | 3/1994 | | |
| GB | 2312348 A | 10/1997 | ............ | H04N/9/75 |
| WO | WO 98/11510 | 3/1998 | | |

* cited by examiner

Primary Examiner—Jingge Wu
(74) Attorney, Agent, or Firm—Gates & Cooper LLP

(57) ABSTRACT

Image data representing a matte, key or control signal is processed. A transitional portion or softness region of the matte in which undesirable transitions occur is identified. The position of the softness region in colour-space is adjusted so as to reduce relative amplitudes of variations within the identified portion.

36 Claims, 34 Drawing Sheets

$$r_c = \frac{r_{min} + r_{max}}{2}$$

$$g_c = \frac{g_{min} + g_{max}}{2}$$

$$b_c = \frac{b_{min} + b_{max}}{2}$$

*Figure 10*

$$r_s = \frac{r_{max} - r_{min}}{2}$$

$$g_s = \frac{g_{max} - g_{min}}{2}$$

$$b_s = \frac{b_{max} - b_{min}}{2}$$

*Figure 11*

$$C_{r,r} = \frac{\sum_{0 \leq i < N} r_i^2}{N} - \mu_r^2$$

$$C_{g,g} = \frac{\sum_{0 \leq i < N} g_i^2}{N} - \mu_g^2$$

$$C_{b,b} = \frac{\sum_{0 \leq i < N} b_i^2}{N} - \mu_b^2$$

$$C_{r,g} = C_{g,r} = \frac{\sum_{0 \leq i < N} C_r C_g}{N} - \mu_r \mu_g$$

$$C_{r,b} = C_{b,r} = \frac{\sum_{0 \leq i < N} C_r C_b}{N} - \mu_r \mu_b$$

$$C_{g,b} = C_{b,g} = \frac{\sum_{0 \leq i < N} C_r C_b}{N} - \mu_r \mu_b$$

$$\text{where } \mu_r = \frac{\sum_{0 \leq i < N} r_i}{N}, \quad \mu_g = \frac{\sum_{0 \leq i < N} g_i}{N}$$

$$\mu_b = \frac{\sum_{0 \leq i < N} b_i}{N}$$

*Figure 13*

$$MC = \begin{pmatrix} c_{r,r} & c_{r,g} & c_{r,b} \\ c_{g,r} & c_{g,g} & c_{g,b} \\ c_{b,r} & c_{b,g} & c_{b,b} \end{pmatrix}$$

from which eigervectors u v & w
are calculated to give a tansformation
matrix such that:

$$\begin{pmatrix} u_1 & u_2 & u_3 \\ v_1 & v_2 & v_3 \\ w_1 & w_2 & w_3 \end{pmatrix} \begin{pmatrix} r_i \\ g_i \\ b_i \end{pmatrix}$$

achieves the desired rotation in colour space.

*Figure 14*

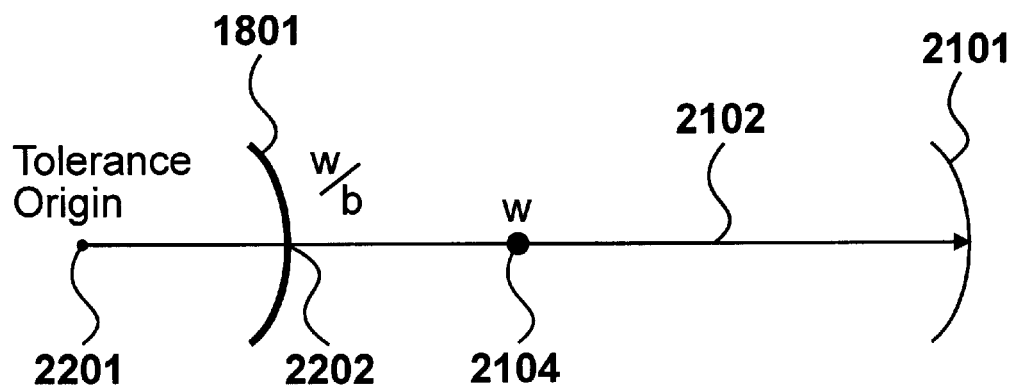
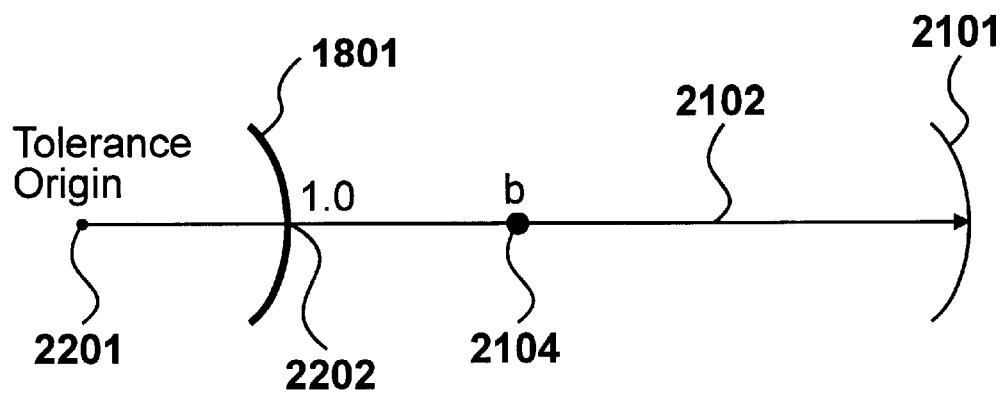
$$\text{Softness} = \frac{w - \frac{w}{b}}{1 - \frac{w}{b}}$$
$$= \frac{wb - w}{b - w}$$
where     0 < Softness < 1.0
*Figure 22*

| Scale x | Scale y | Scale z | Variance |
|---------|---------|---------|----------|
| 1.0 | 1.0 | 2.0 | ..... |
| 1.2 | 1.2 | 1.7 | ..... |
| 1.2 | 1.7 | 1.2 | ..... |
| 1.7 | 1.3 | 1.5 | ..... |
| 2.0 | 1.0 | 1.0 | ..... |

3201 → row 1
3202 → row 2

ADJUSTING A SOFTNESS REGION

FIELD OF THE INVENTION

The present invention relates to the processing of image data representing a matte, key or control signal.

INTRODUCTION TO THE INVENTION

Many compositing techniques are known in which a first image is combined with a second image selectively at positions throughout the image. The technique is known in cinematographic post production in which silhouettes or mattes are used to blank out portions of the image. Similar techniques have been used in broadcast video applications in which a control signal or a key signal is used to selectively derive images from a first video source or from a second image source. Such key signals may also be represented as images or, during the transmission of video data, control signals may be distributed in parallel with image signals in which the control channel is often referred to as the alpha channel.

In cinematographic film it is possible to produce hard edged mattes given the very high spatial definition of the media. However, when images are transmitted as video signals, at broadcast definition or at a higher definition, it is necessary to quantise the spatial images, thereby significantly reducing the availability of spatial definition.

It has been known for some time that the reduced spatial definition of a video image may be compensated by increased depth such that sub-pixel boundaries may be perceived by the eye by averaging colours at the actual position of the pixels. Similarly, control signals or key signal may be produced which provide for soft blending between the value representing a hard-key-on and a value representing a hard-key-off. Typically, such signals are recorded to a depth of eight bits with a similar eight bits being allocated for the red green and blue colour components.

In a process of chroma-keying, soft values for keys may be produced at image edges where pixels will be quantised with colour components being partially derived from a foreground image and partially derived from the background key colour. Thus, it is possible to derive soft-edge keys automatically which may then be used to smoothly blend a foreground image against a new background image. Furthermore, characteristics of the blending edge may be referred to as the softness of the edge and the key values may be modified in order to enhance the properties of softness.

Soft keys can also be used to key transparent and translucent objects against new backgrounds. Soft keys allow the new background colour to be partially mixed with the new foreground and the blue components present within the original foreground image are suppressed by a process of colour suppression; as is well known in the chroma-keying art. However, many translucent and transparent objects are not uniformly transparent and may achieve their transparency by being made up from very small regions which are either very opaque or very transparent. Thus, when used to produce a soft key signal in a chroma-keying process, it is likely that the transparent region will be perceived as noise and will not achieve the required effect.

A system in which each pixel is represented by three colour components defining a position within colour-space is disclosed in International patent publication WO 98/11510. A base colour is identified and a distance in colour-space between an input colour and said base colour is calculated. The control value, which may be used as a basis for chroma suppress or a chroma-key, is produced in response to the calculated distance.

The system disclosed in this publication provides improved procedures for producing a chroma-key, thereby achieving improved chroma-keying results. However, a problem with the system is that it is difficult for users to control operational parameters so as to make optimum use of the processing facilities available.

A system for processing image data taking the form of a plurality of image pixels forms the subject matter for the applicant's co-pending British patent application (DL\P407-GB). A three-dimensional representation of colour-space is displayed and the colour of pixels within an image is analysed. Thereafter, the analysed pixels are displayed at colour related positions within the displayed colour-space.

An advantage of this improved approach is that a user is provided with a graphic visualisation of colour-space regions, thereby allowing colours defined in colour-space to be graphically identified as forming part of a tolerance region or a softness region within colour-space.

A problem associated with defining softness regions is that some textures within an image, such as translucent textures, may produce adverse affects. The development of a chroma-key involves non-linear processes in order to extract the key signal whereupon it is possible for the texture, perceived as noise, to become amplified in parts of the image where intermediate values are generated. This results in clearly visible processing artefacts which could severely restrict the application of the process when textures of this type are present.

SUMMARY OF THE INVENTION

According to a first aspect of the present invention, there is provided a method of processing image data representing a matte, key or control signal, comprising steps of identifying a transitional portion of said matte in which undesirable transitions occur in a form displayed as noise artefacts, comprising steps of adjusting the position of a softness region in colour-space so as to reduce the relative amplitudes of variations within said identified portion.

Preferably, the matte is generated by a process of chroma-keying. Preferably, relative amplitudes are reduced by modifying a softness region so as to reduce the presence of high frequency variations. The softness region may be perturbed iteratively, with frequency distributions being measured for each perturbation and a selection of a preferred perturbation being made on the basis of said measurements. The frequency values may be determined by performing a Fourier transform against the softness values.

In a preferred embodiment, a softness region is an ellipsoid and the position of the softness region is modified by transforming the shape of the ellipsoid. A stretching operation may be performed against the ellipsoid and the ellipsoid may be determined by defining a convex hull around a plurality of pixel colours defined in colour-space.

According to a second aspect of the present invention, there is provided image data processing apparatus configured to process image data representing a matte, key or control signal, comprising identifying means for identifying a transitional portion of said matte in which undesirable transitions occur in a form displayed as noise artefacts; and adjusting means configured to adjust the position of a softness region in colour-space so as to reduce the relative amplitudes of variations within said identified portion.

In a preferred embodiment, display means are provided for displaying an ellipsoid to an operator in colour-space and the shape of the displayed ellipsoid may be modified in response to manual operation of a manually operable device.

DETAILED DESCRIPTION OF THE PREFERRED EMBODIMENTS

FIG. 8 illustrates the three dimensional equivalent of connecting the outermost pixels shown in FIG. 7, thereby forming a tessellated surface of a convex hull in colour-space;

FIG. 9 illustrates a bounding box in colour-space which most efficiently bounds the convex hull shown in FIG. 8;

FIG. 10 illustrates the equations used to determine the centre of the bounding box shown in FIG. 9;

FIG. 11 illustrates the equations used to determine scaling factors in colour-space to normalise the box shown in FIG. 9 to a cube;

Figure 1:
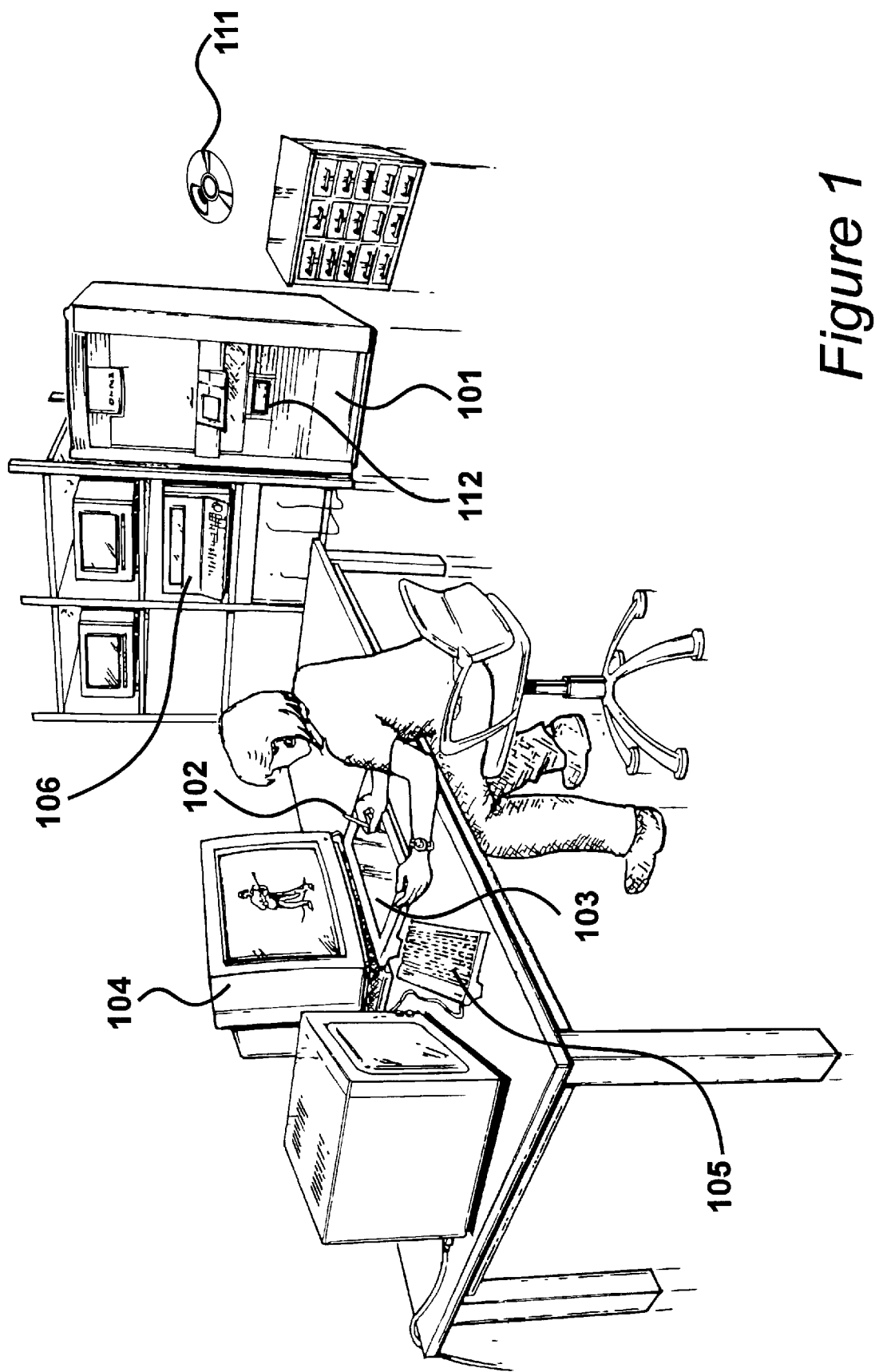
FIG. 1 shows a compositing station arranged to combine images using a process of chroma-keying, including a processing system.
Figure 2:
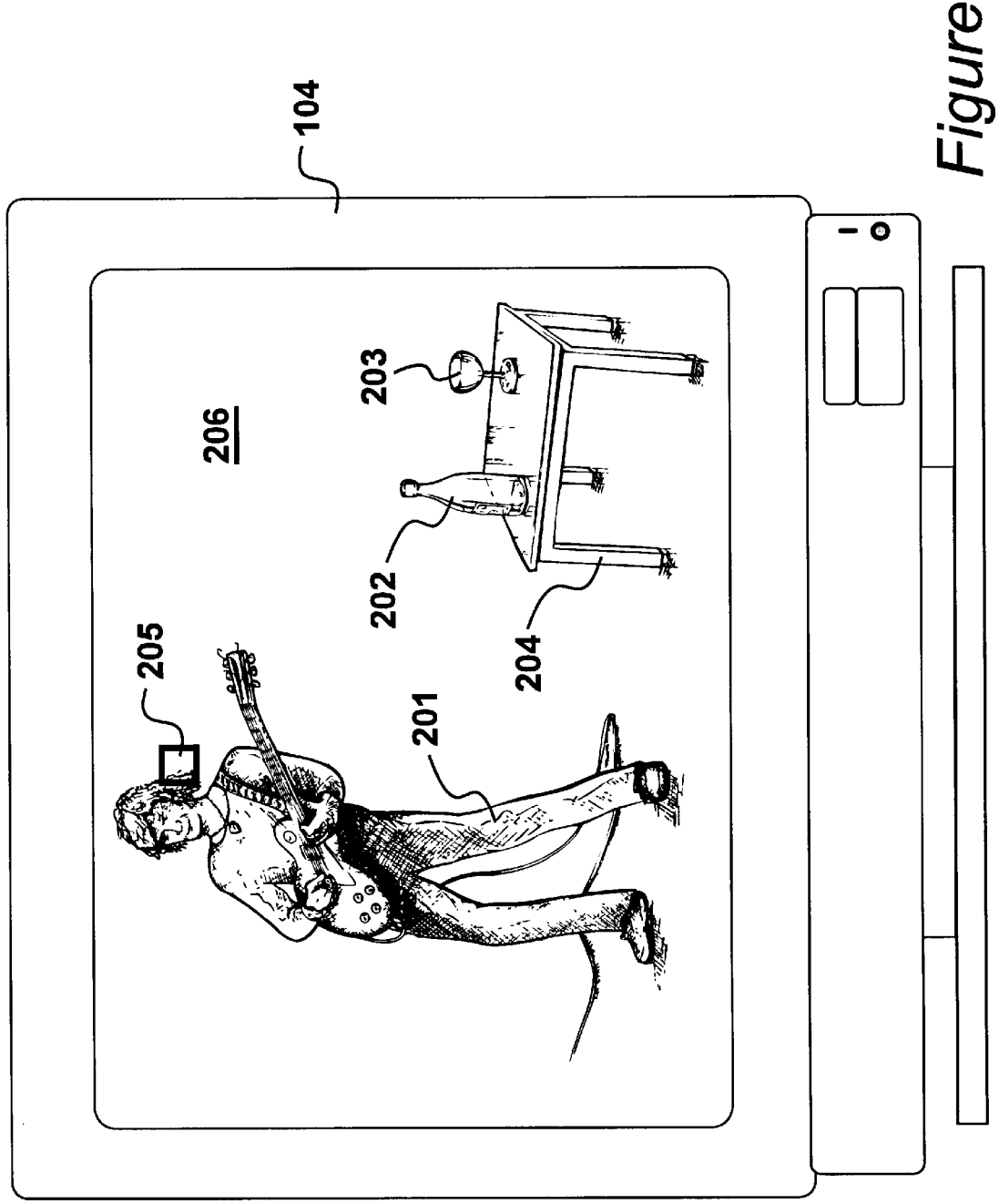
FIG. 2 shows an example of a foreground image to be composited against a new background image, using the equipment identified in FIG. 1, and including foreground talent.
Figures 8, 9:
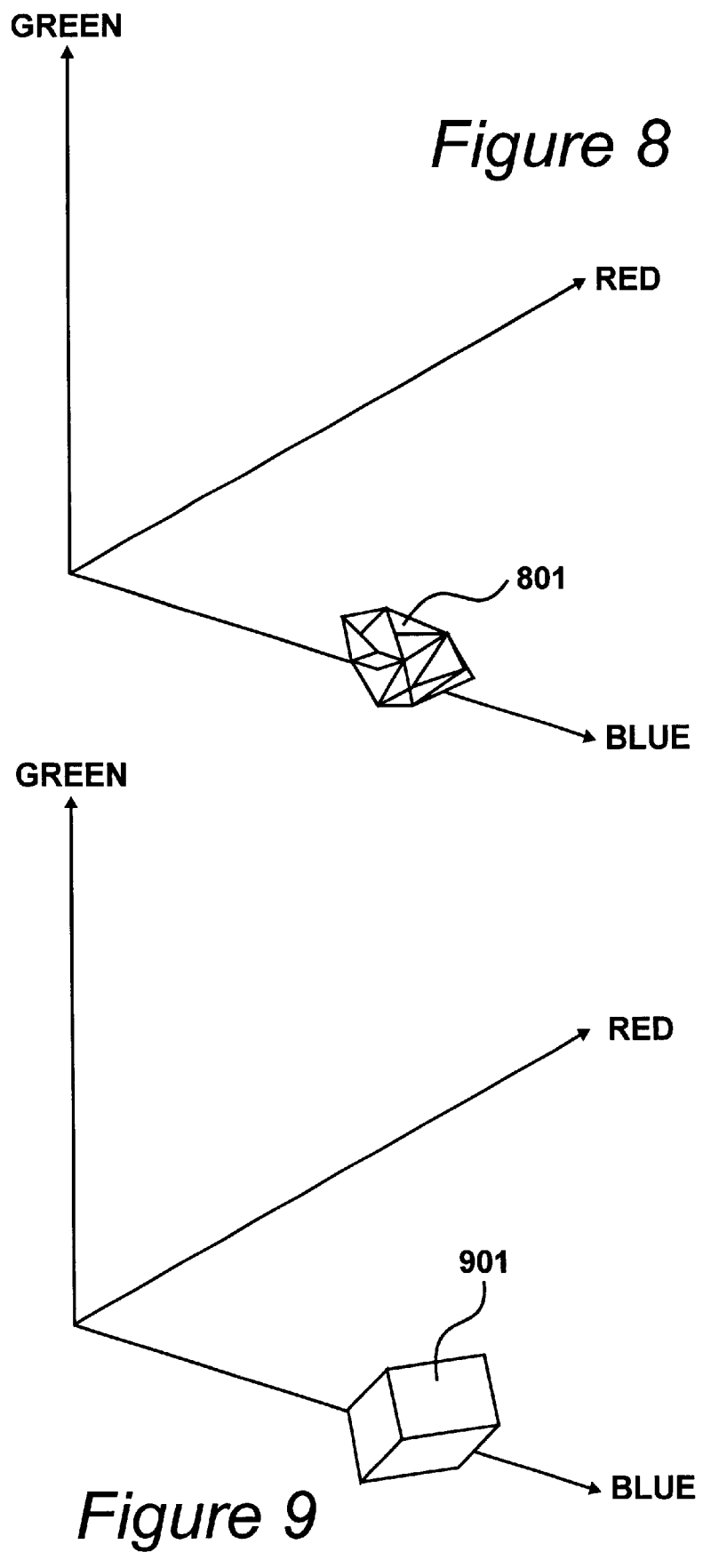
Figure 12:
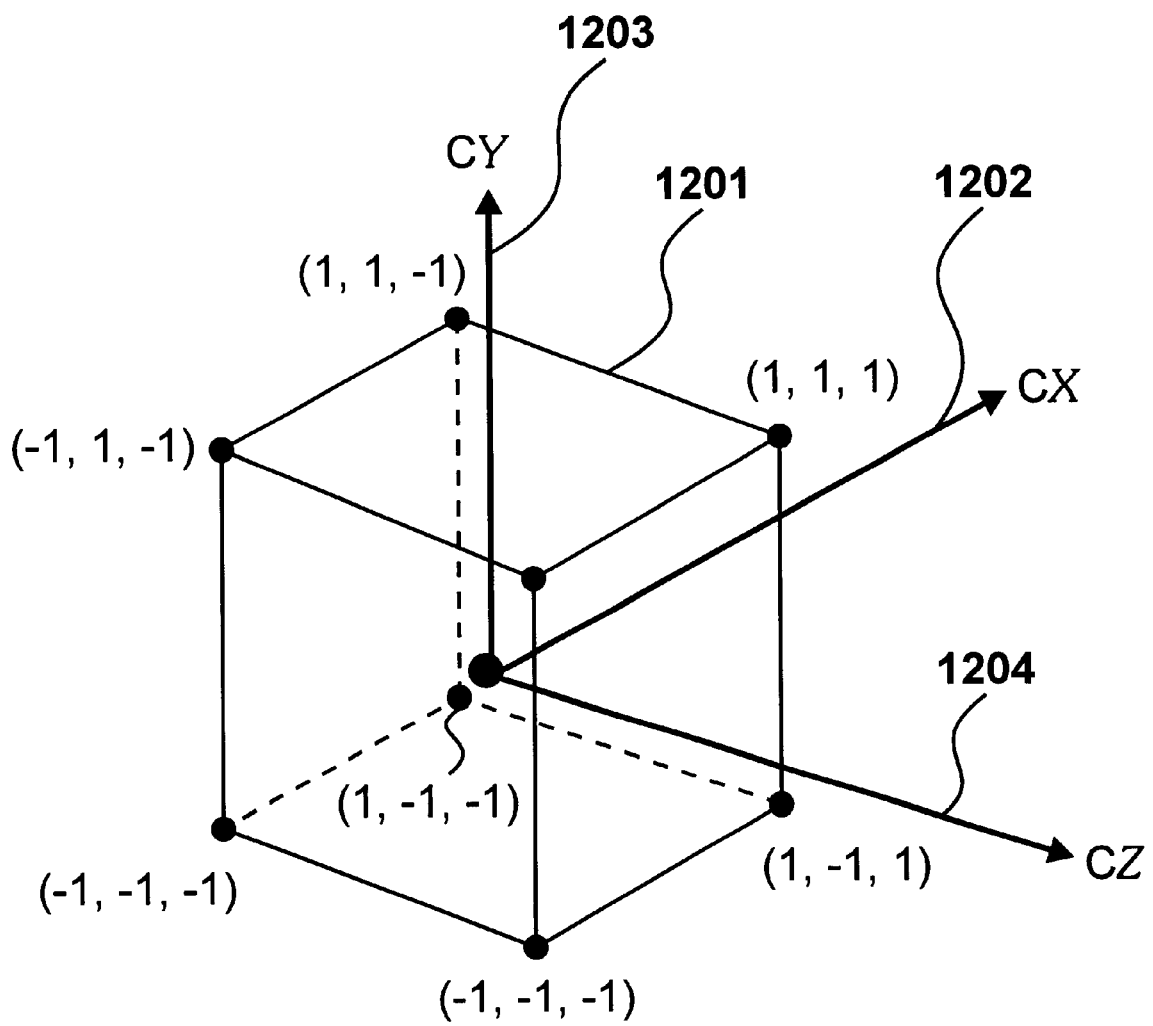
FIG. 12 illustrates a normalised, rotated cube derived from the rectangular box shown in FIG. 9.
Figure 15:
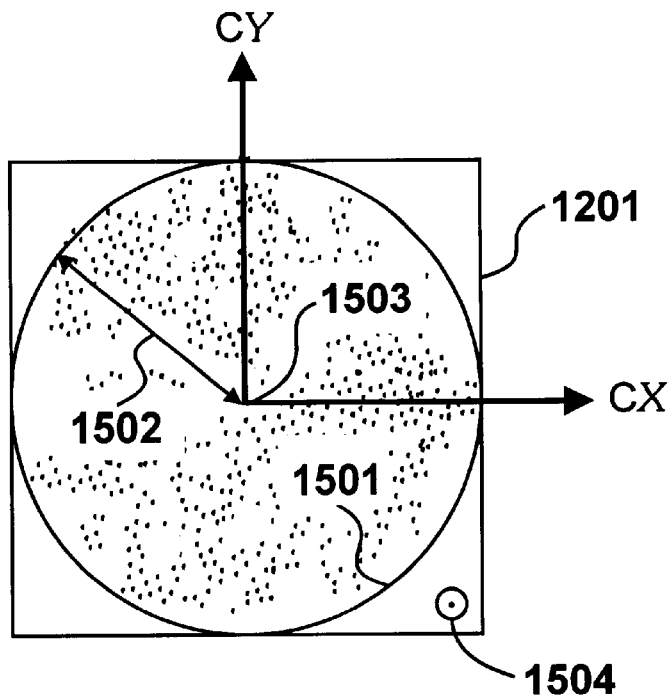
Figure 16:
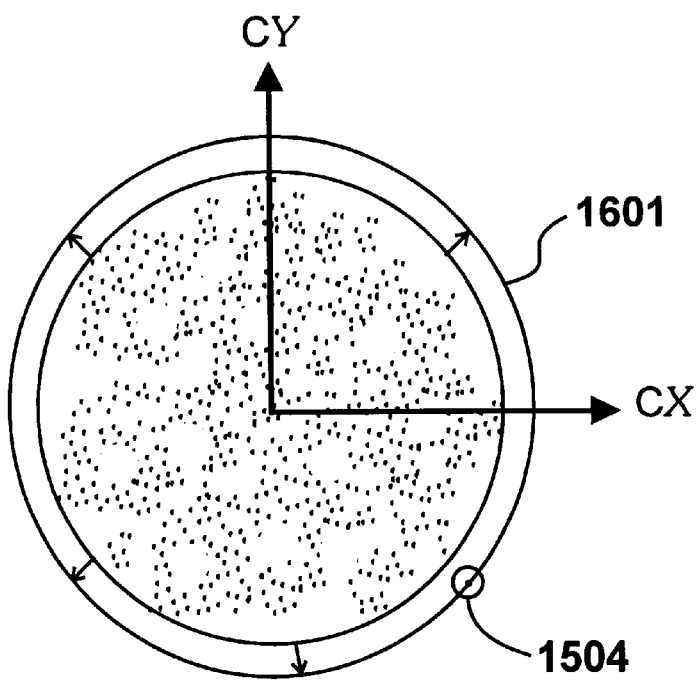
Figure 17:
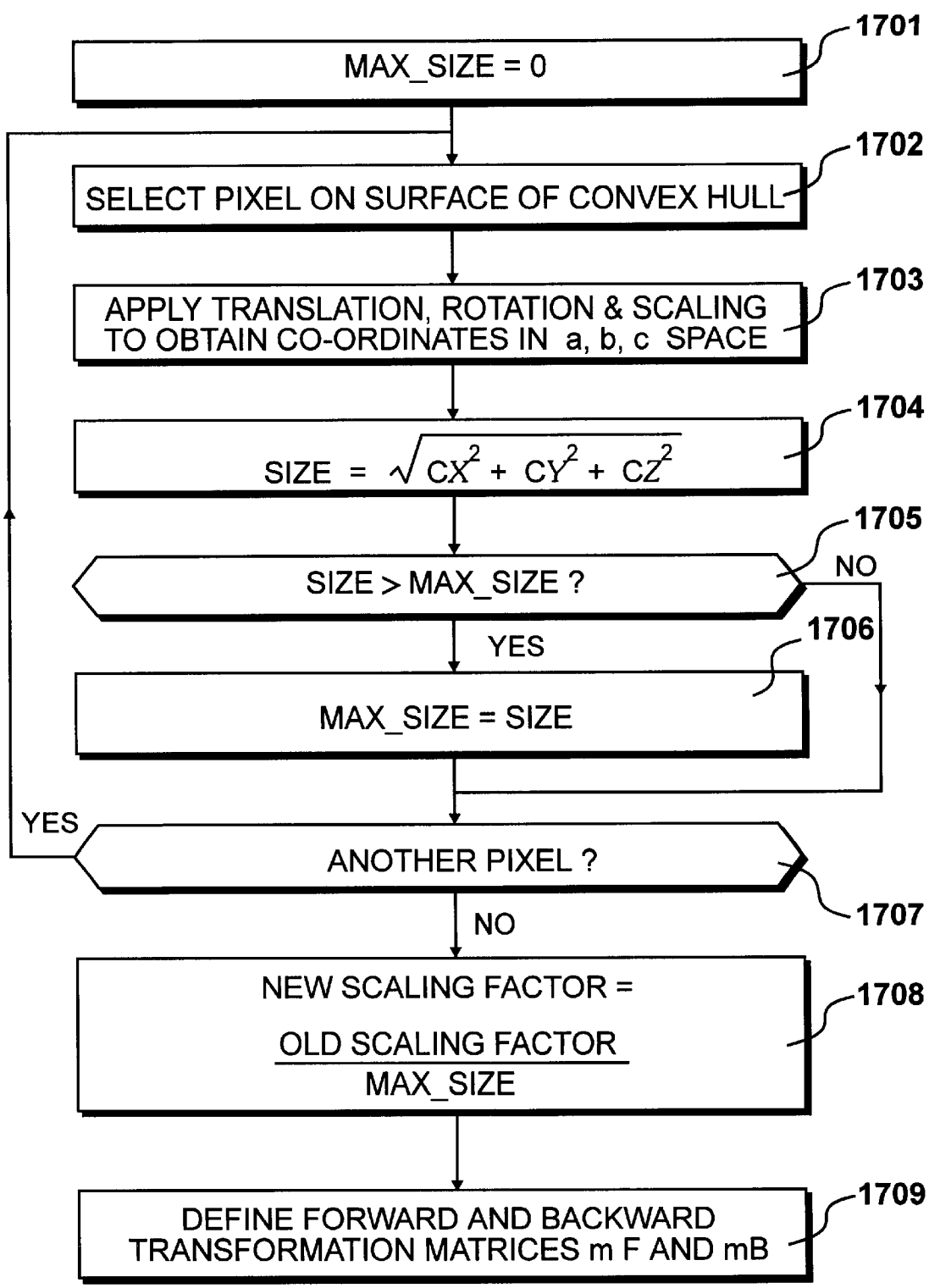
Figure 18:
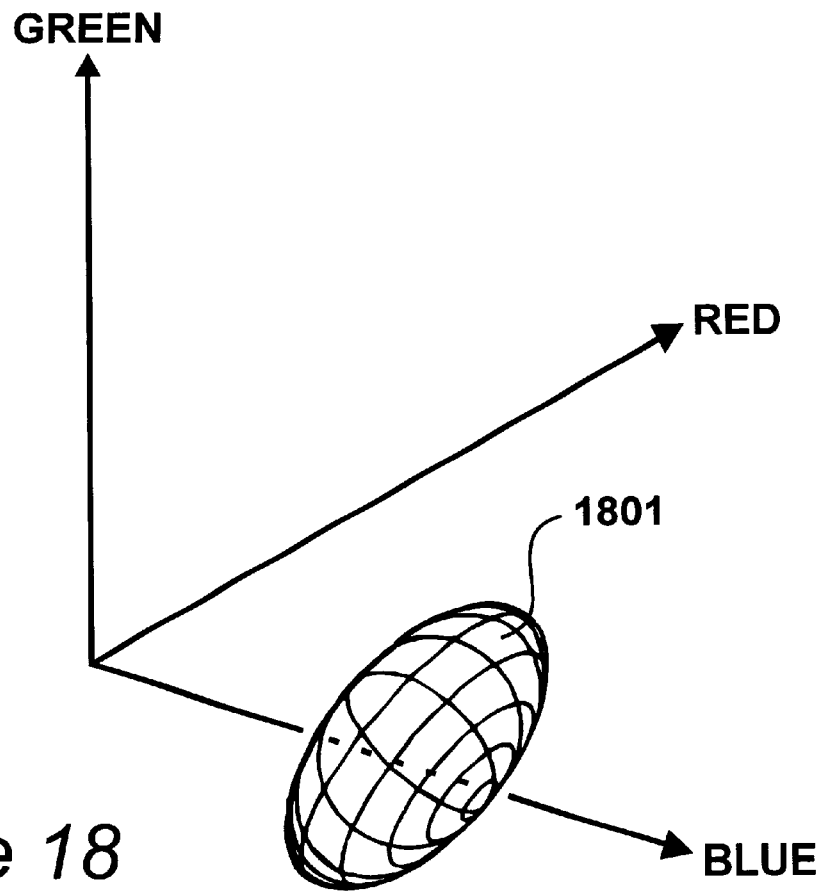
Figure 19:
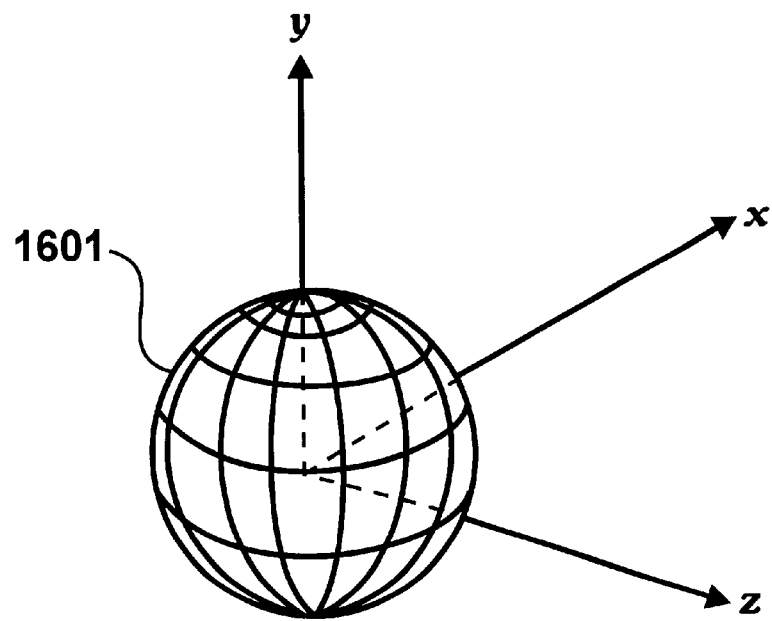
Figure 20:
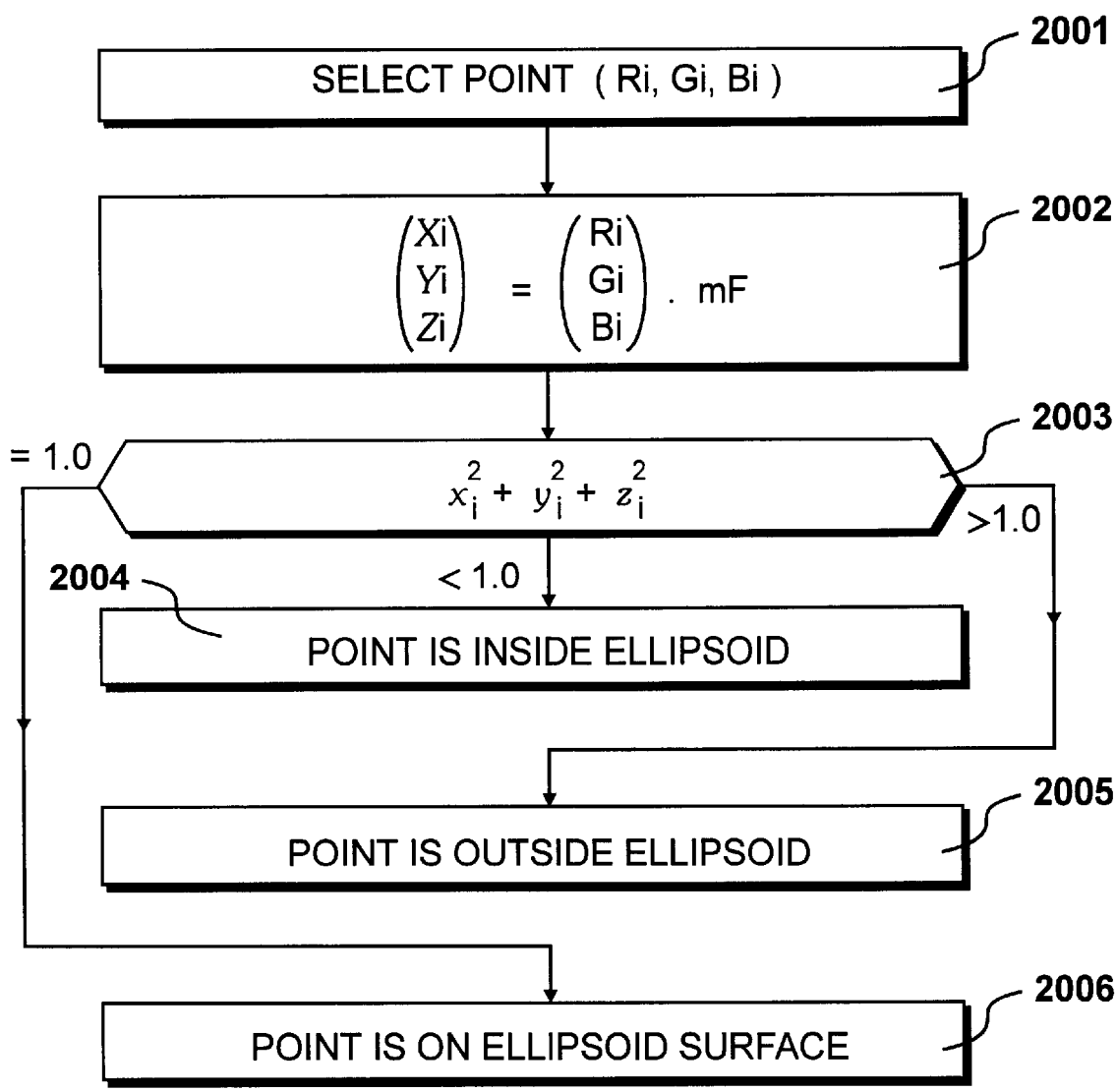
Figure 21:
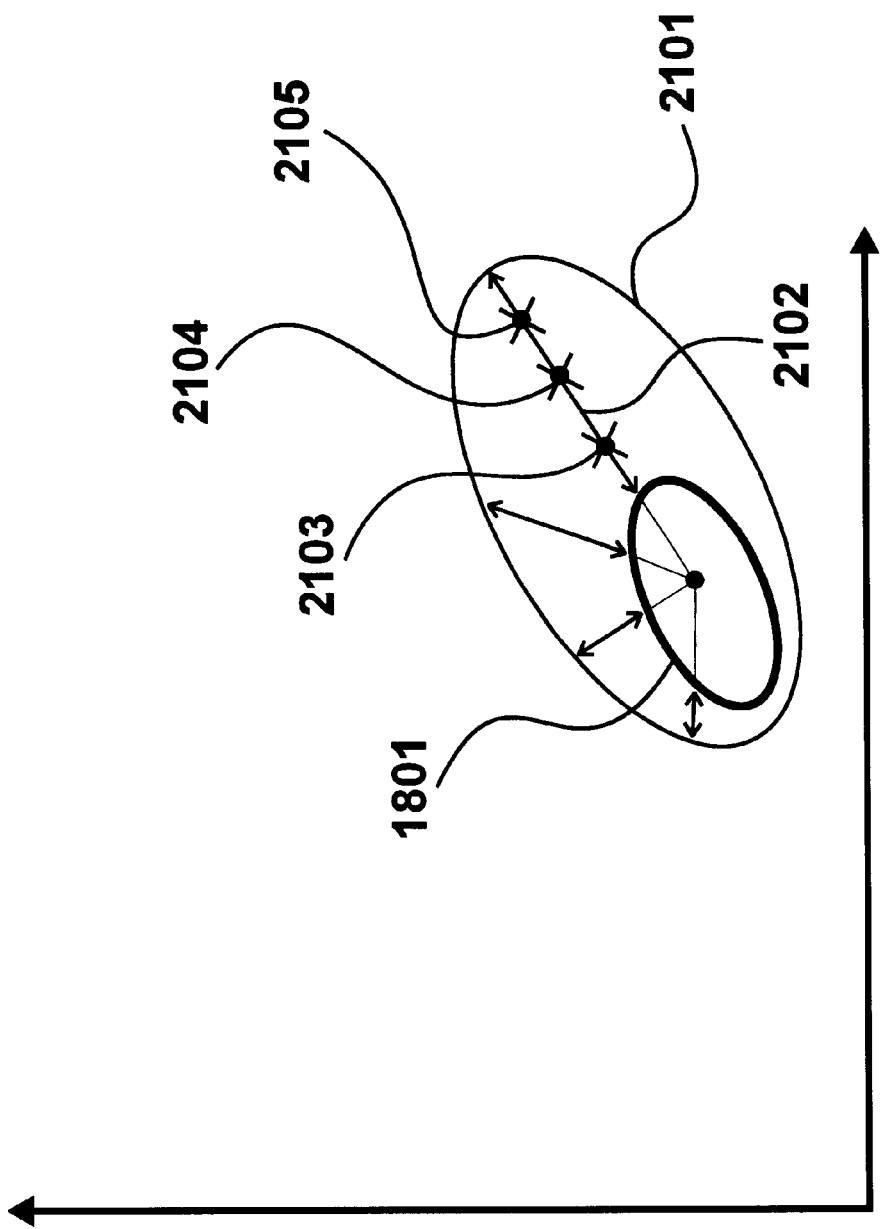
Figure 23:
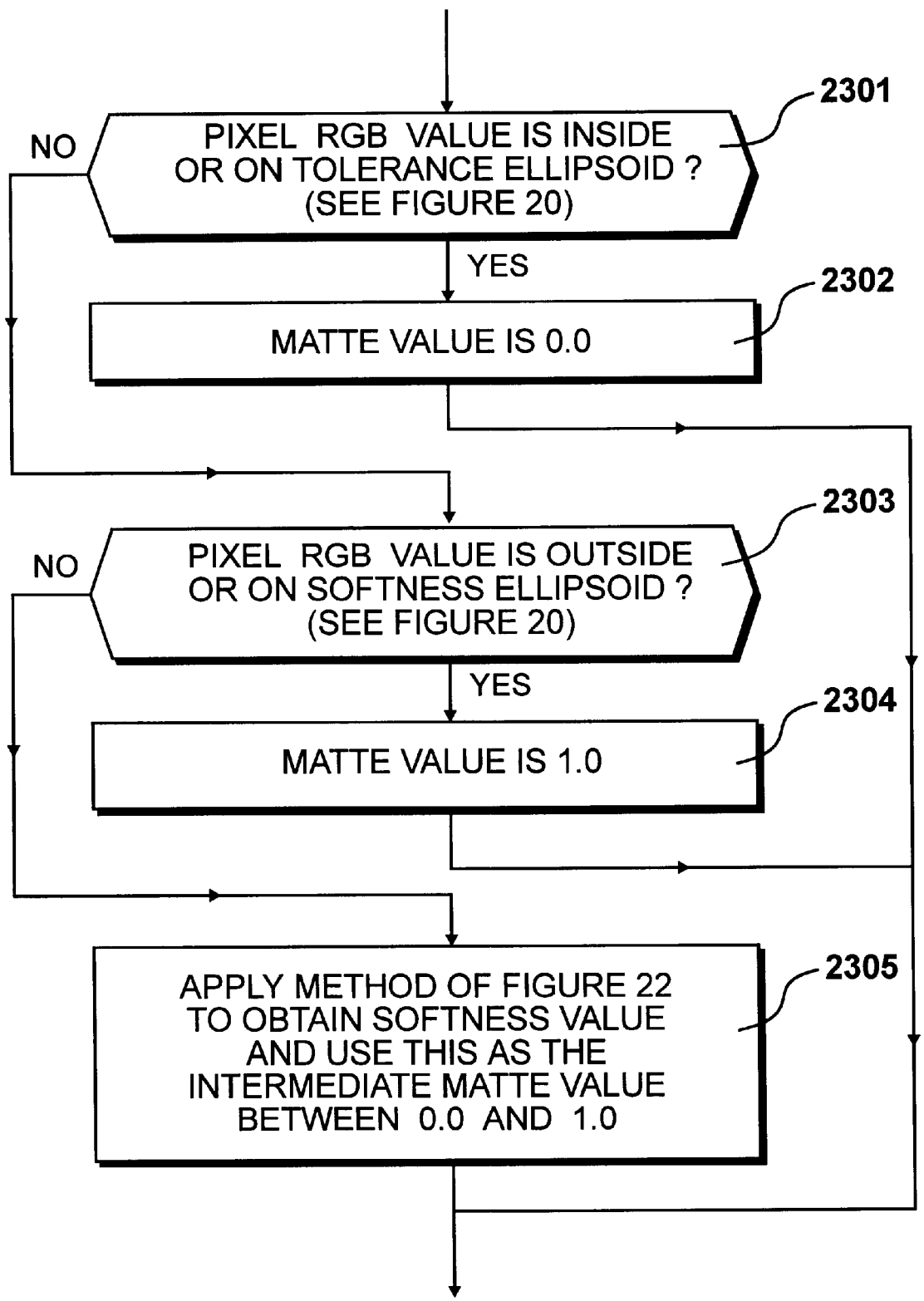
Figure 24:
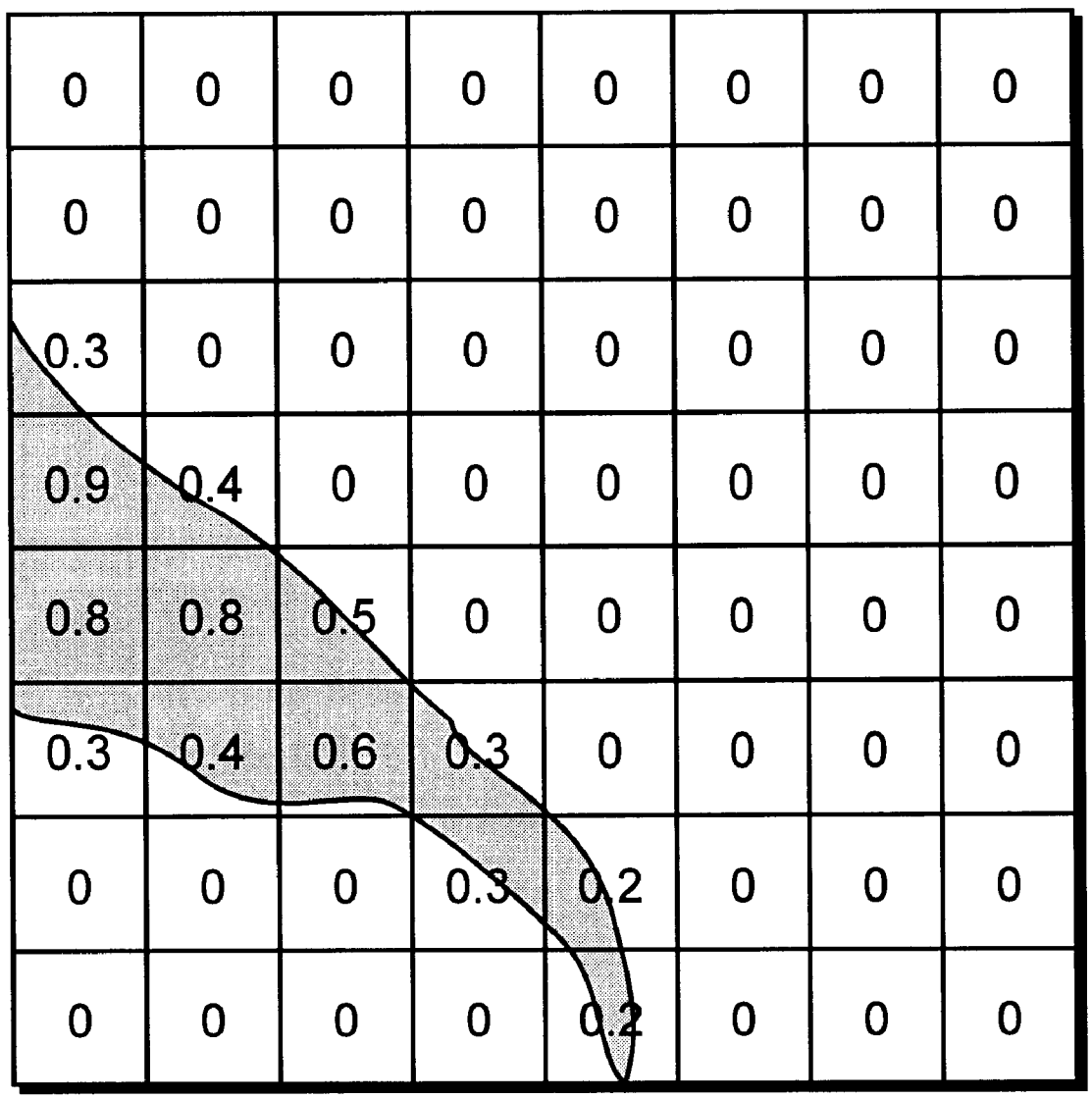
Figure 25A:
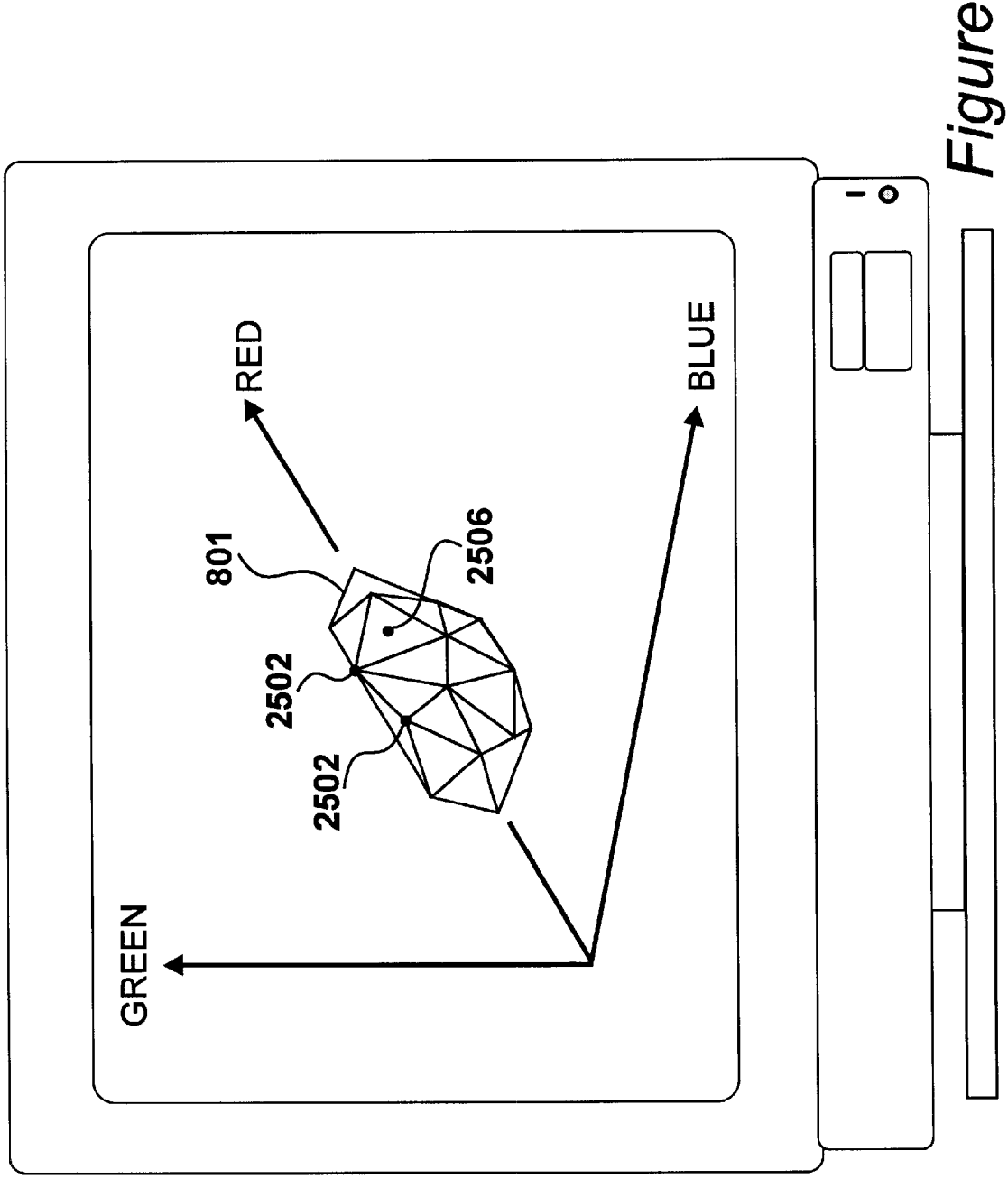
Figure 25B:
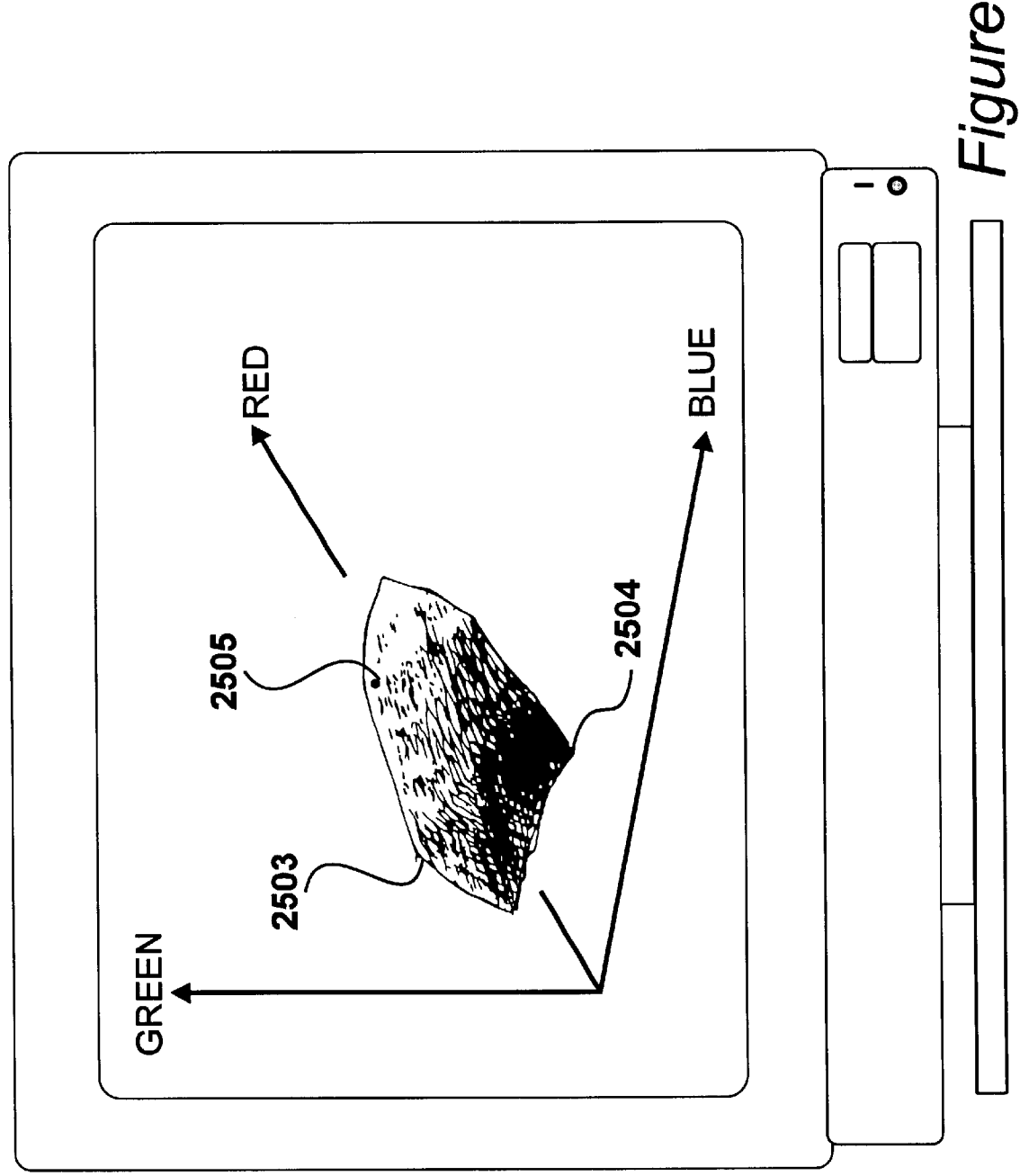
Figure 26A:
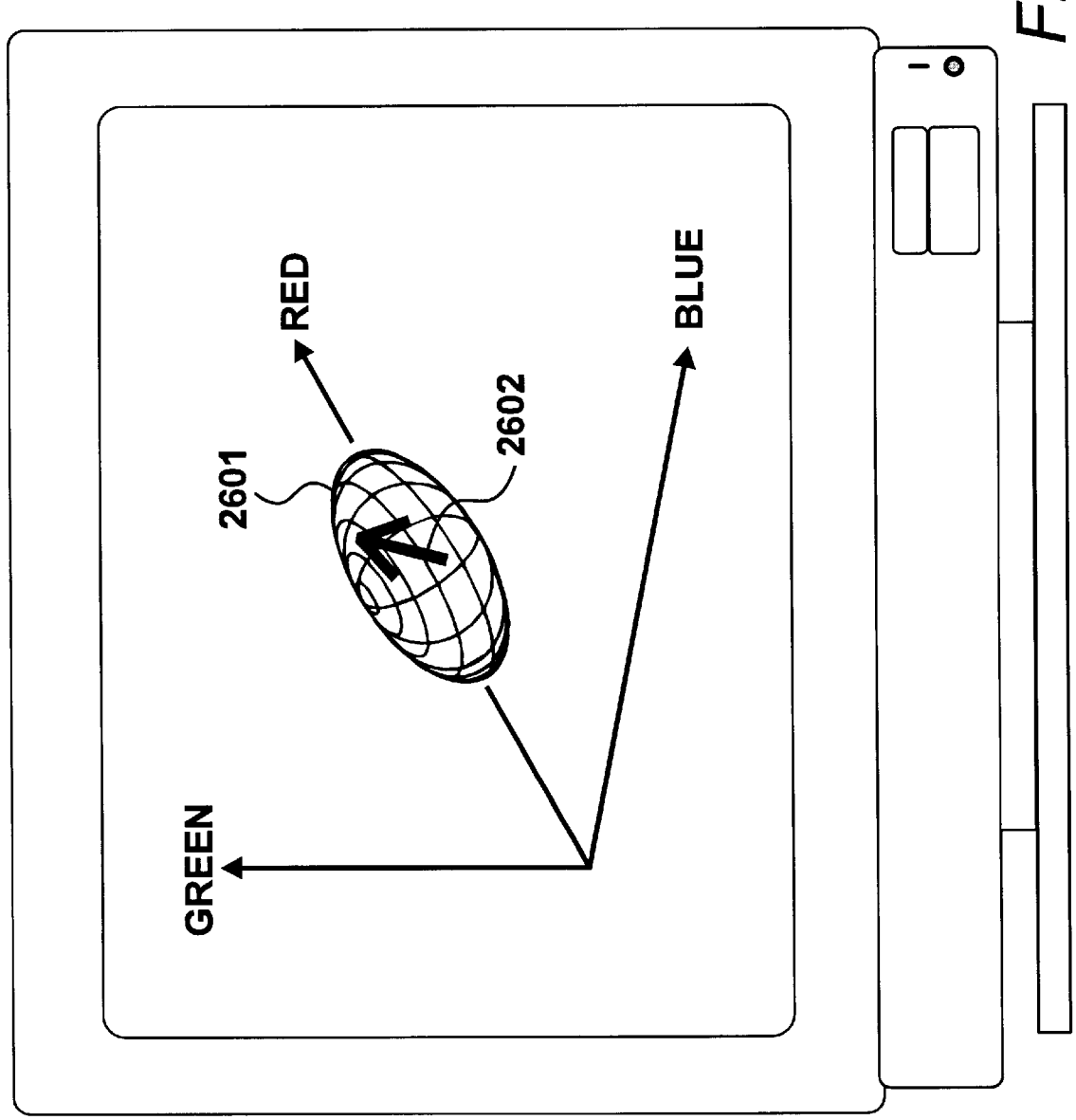
Figure 26B:
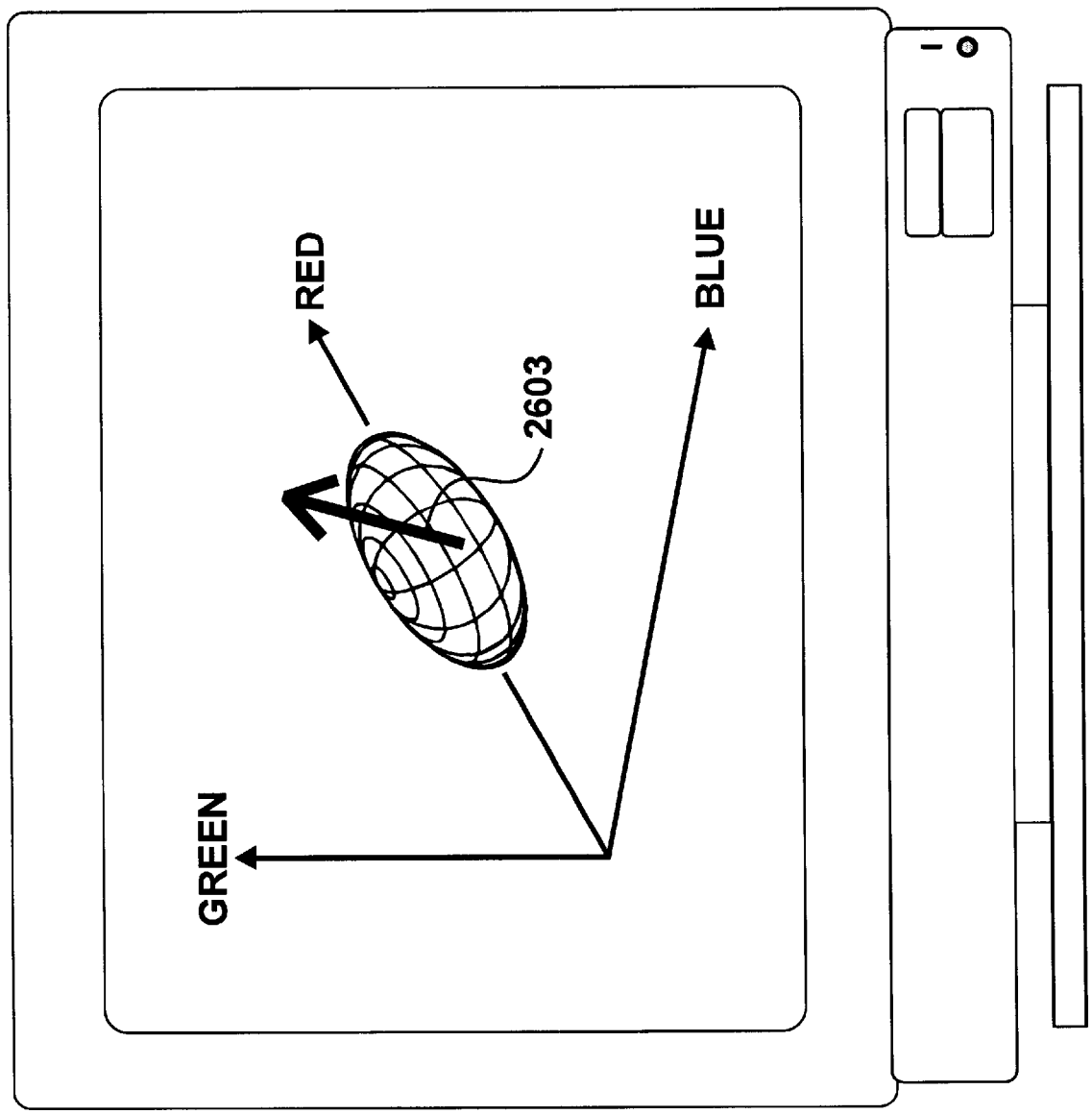
Figure 26C:
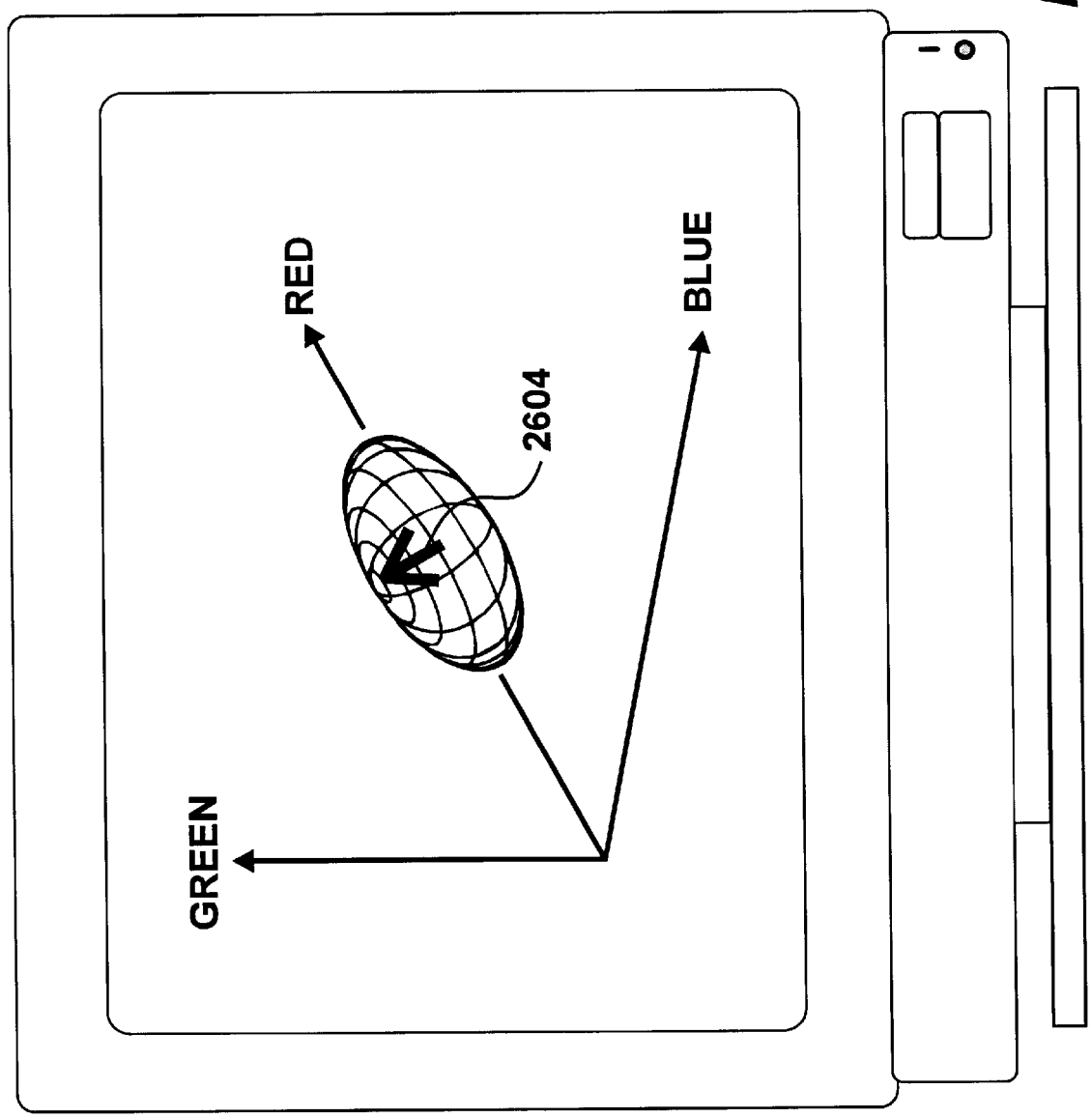
Figure 27A:
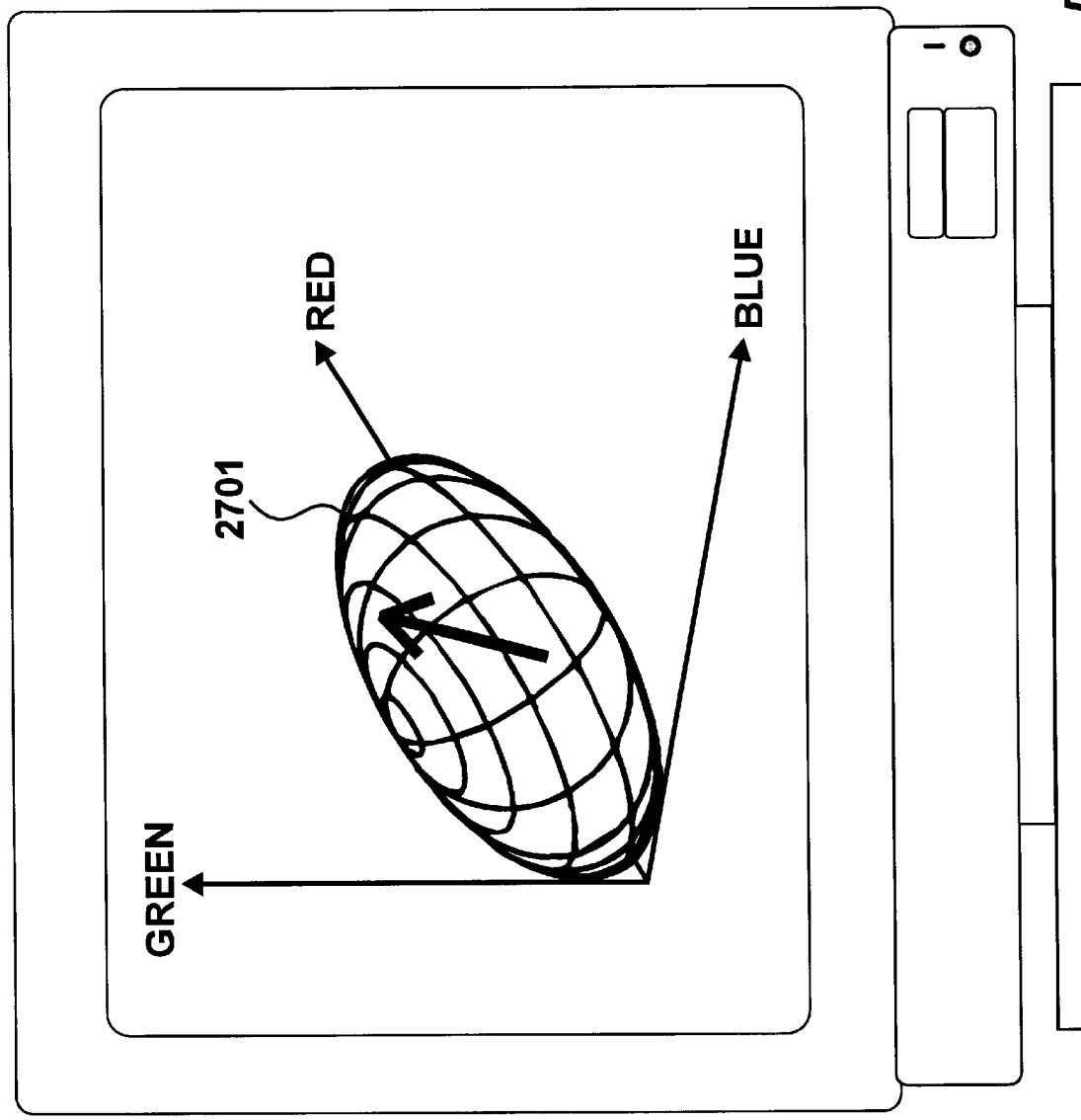
Figure 27B:
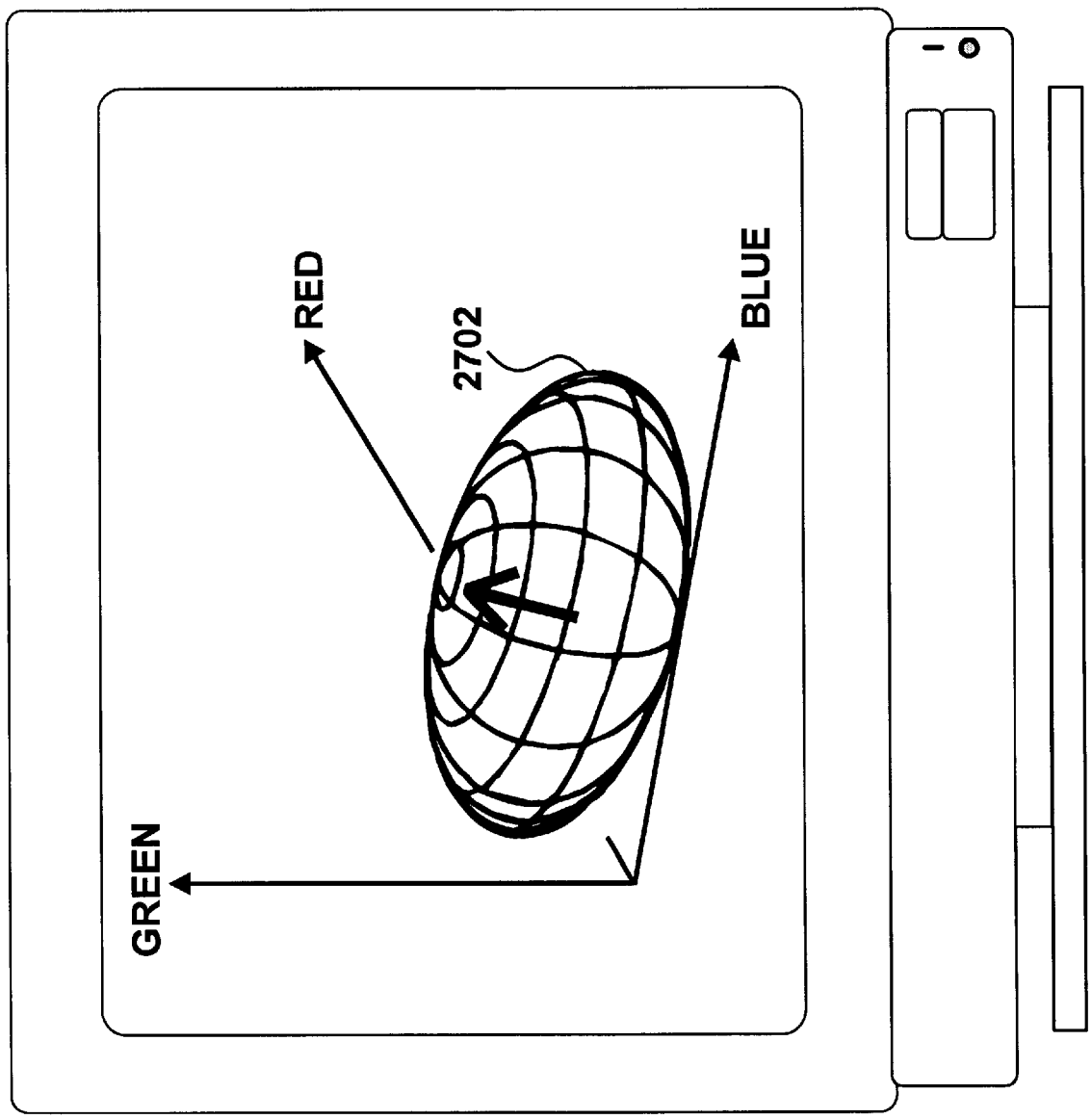
Figure 28:
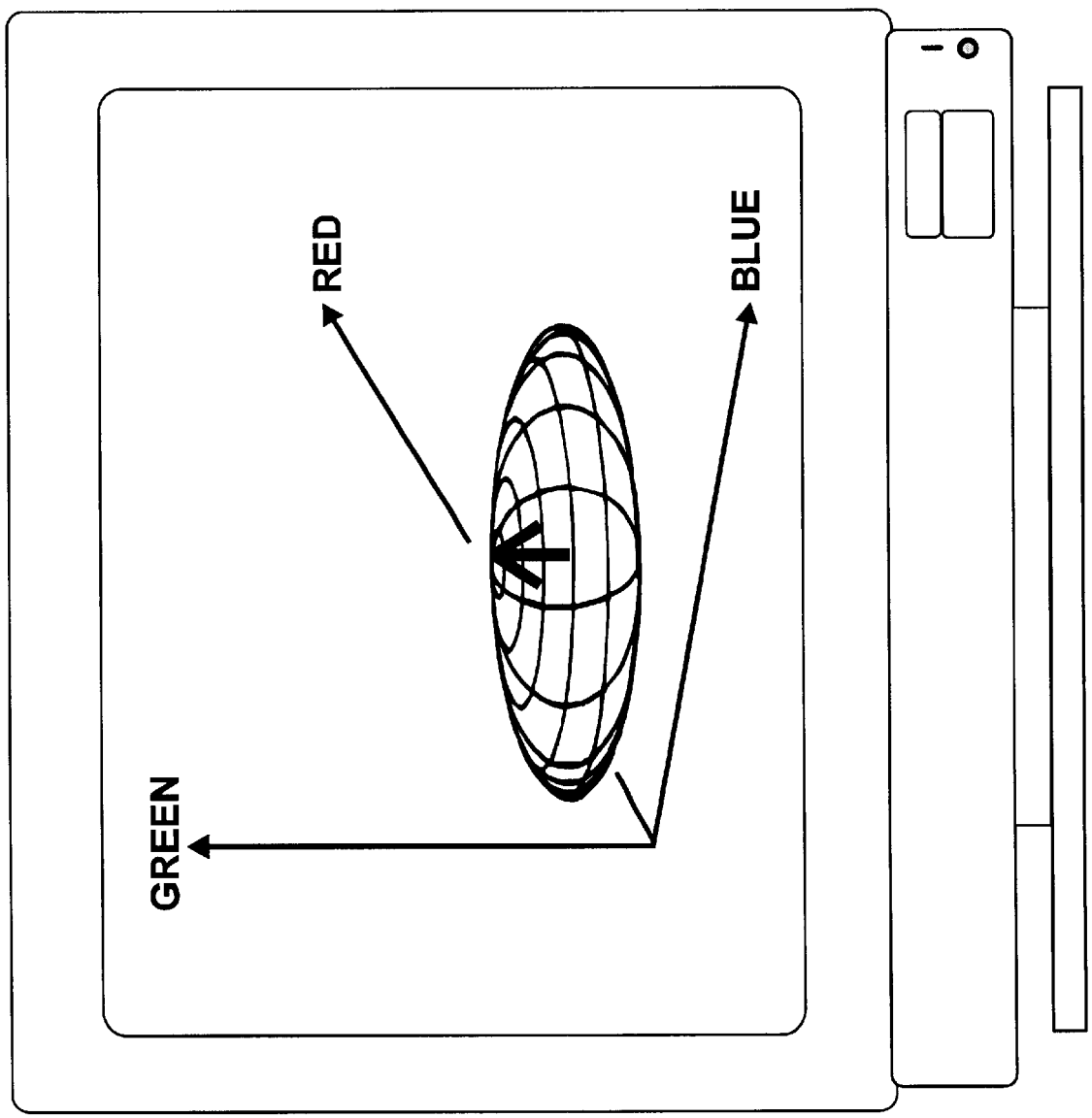
Figure 29:
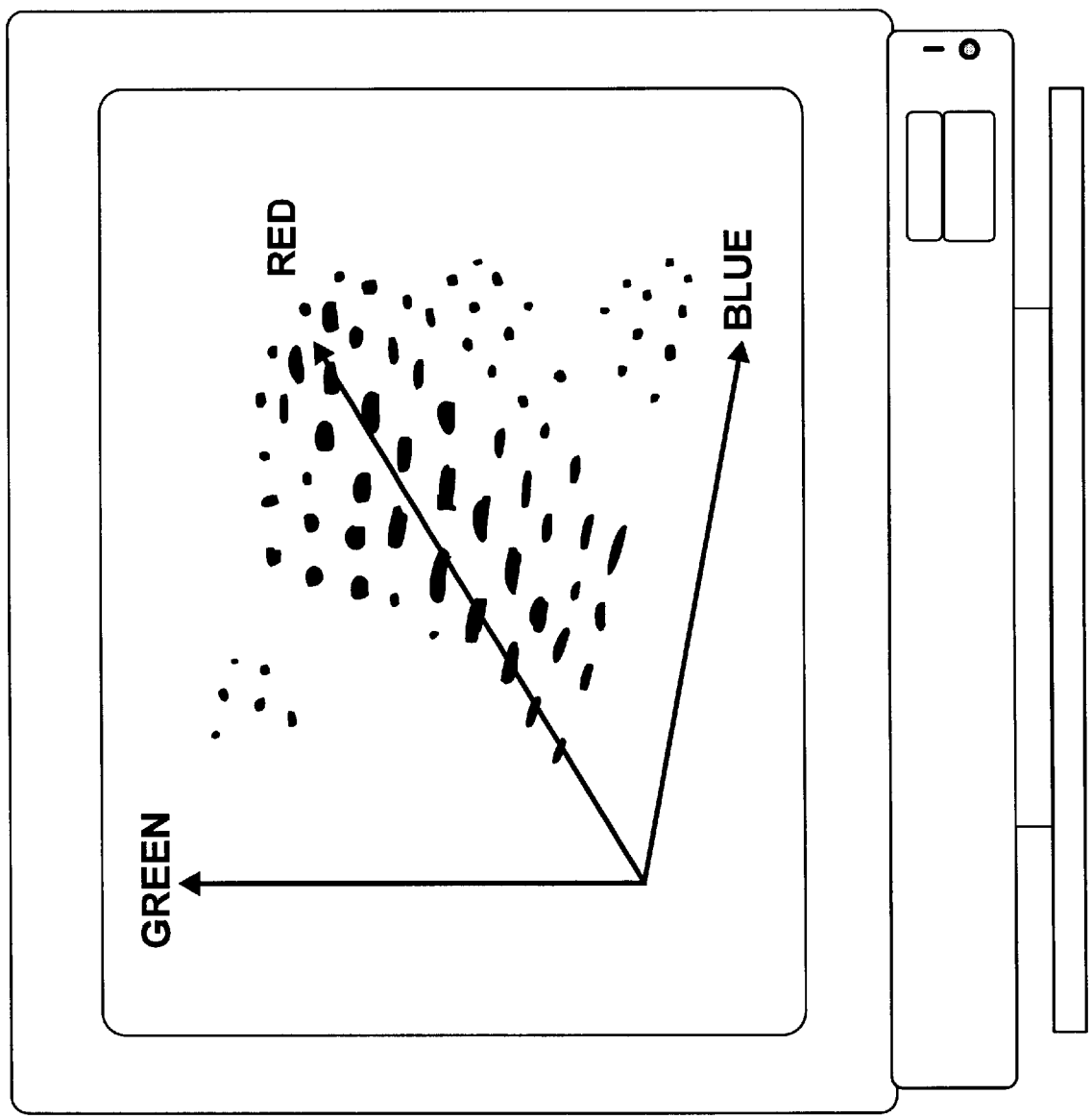
Figure 30:
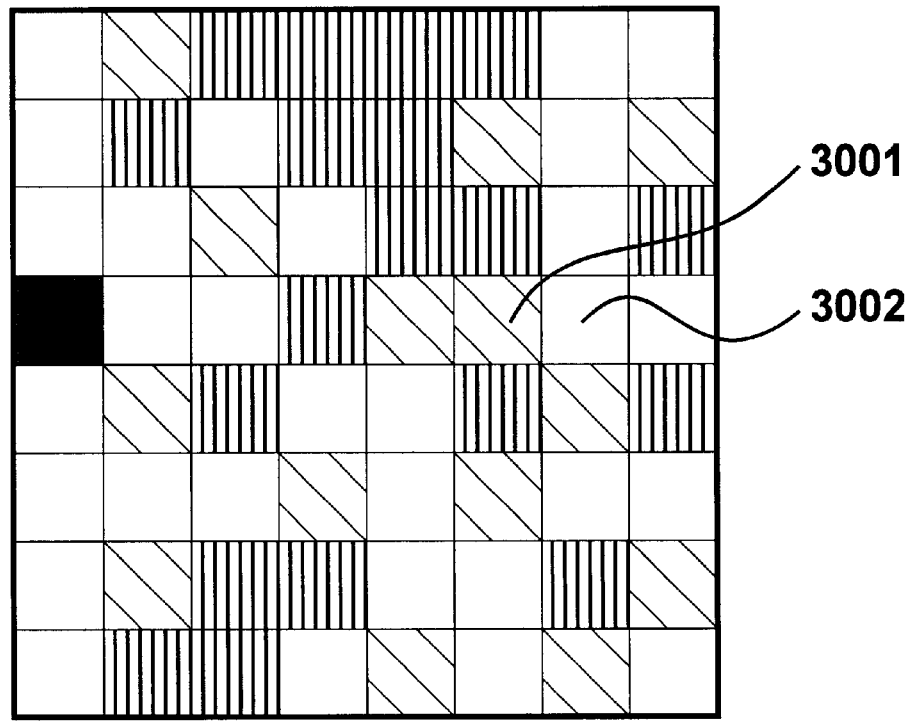
Figure 31:
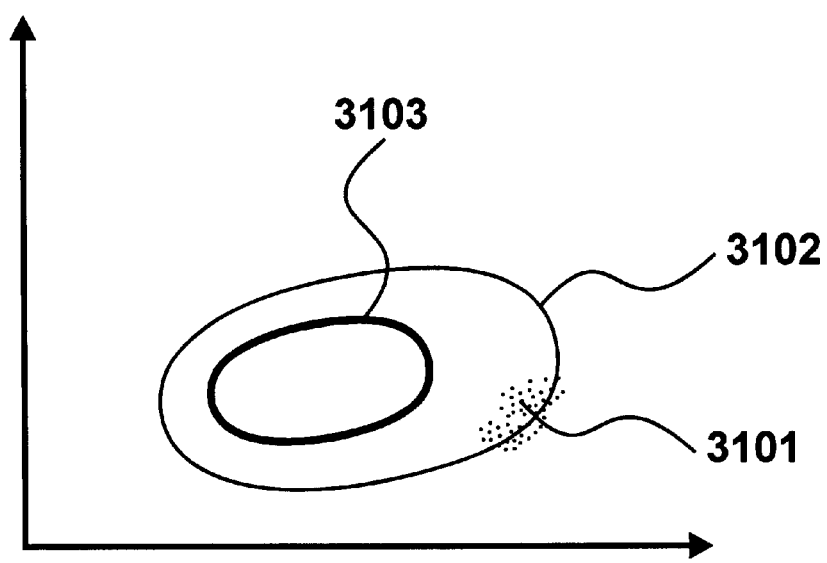
Figure 32:
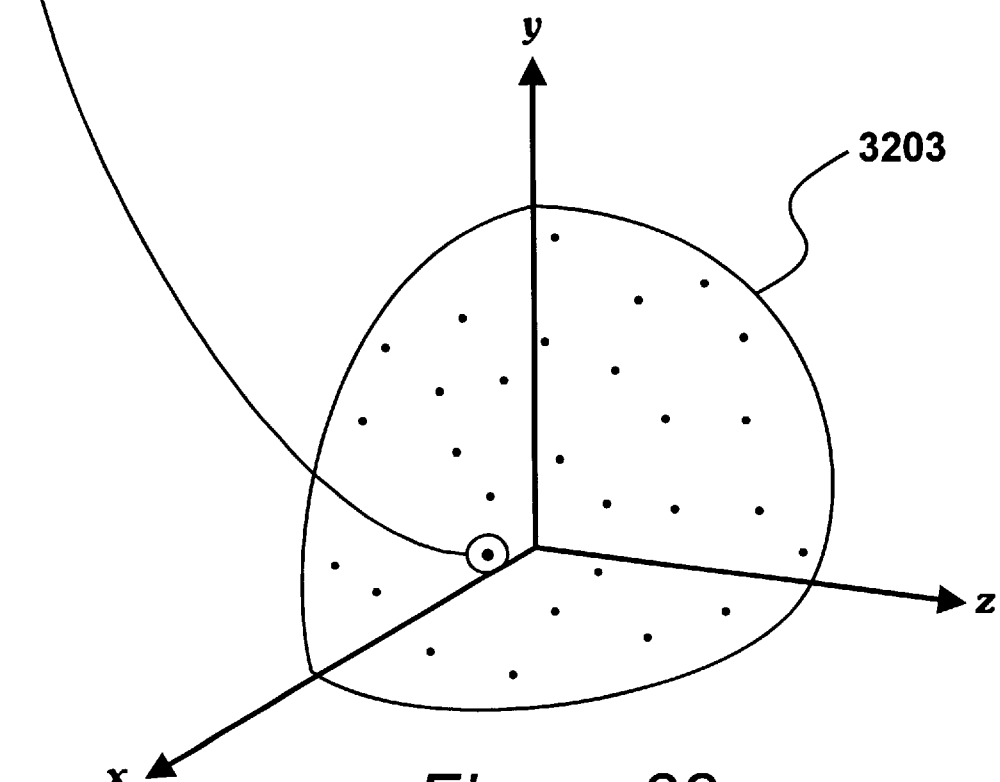
Figure 33:
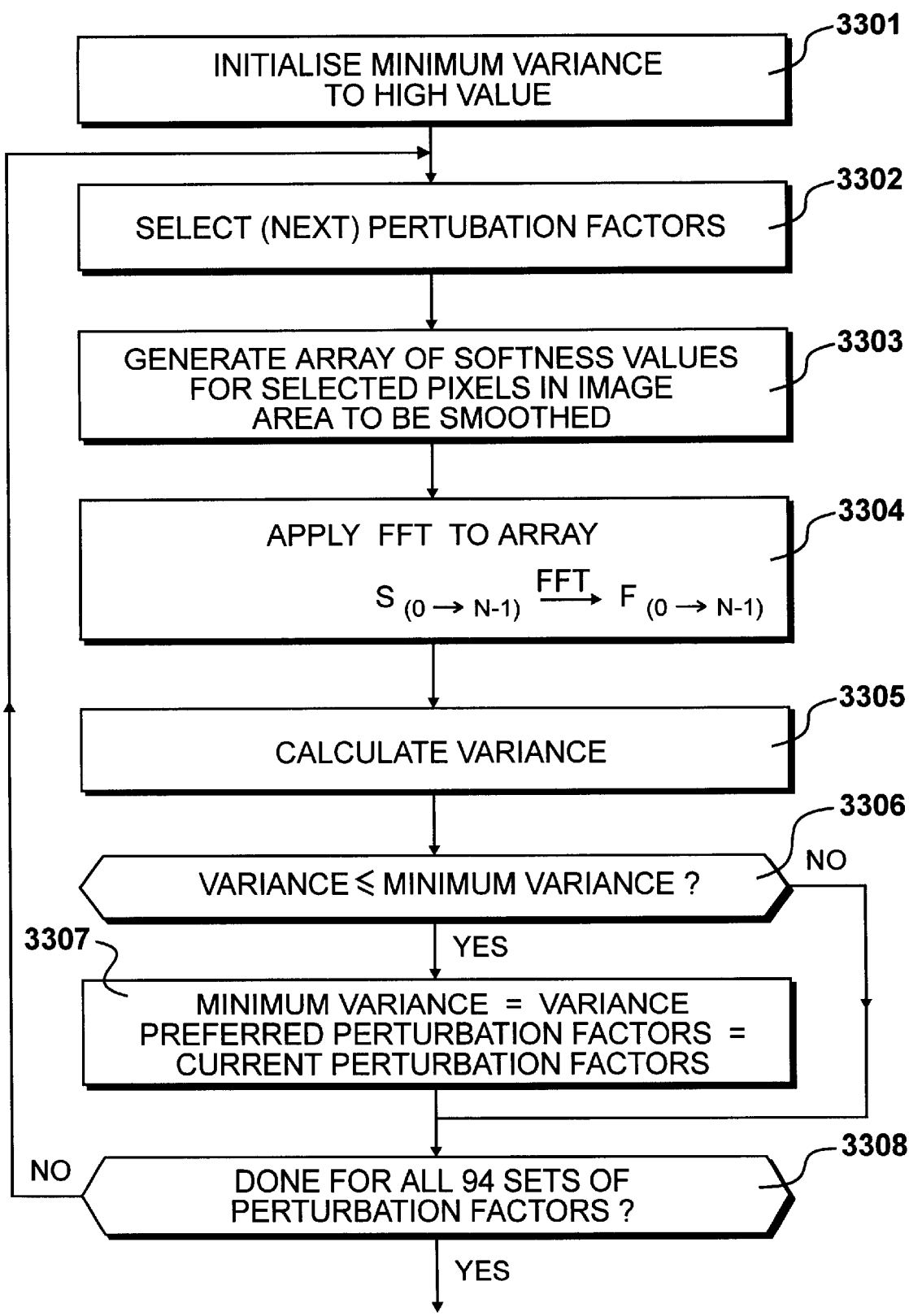
Figure 34:
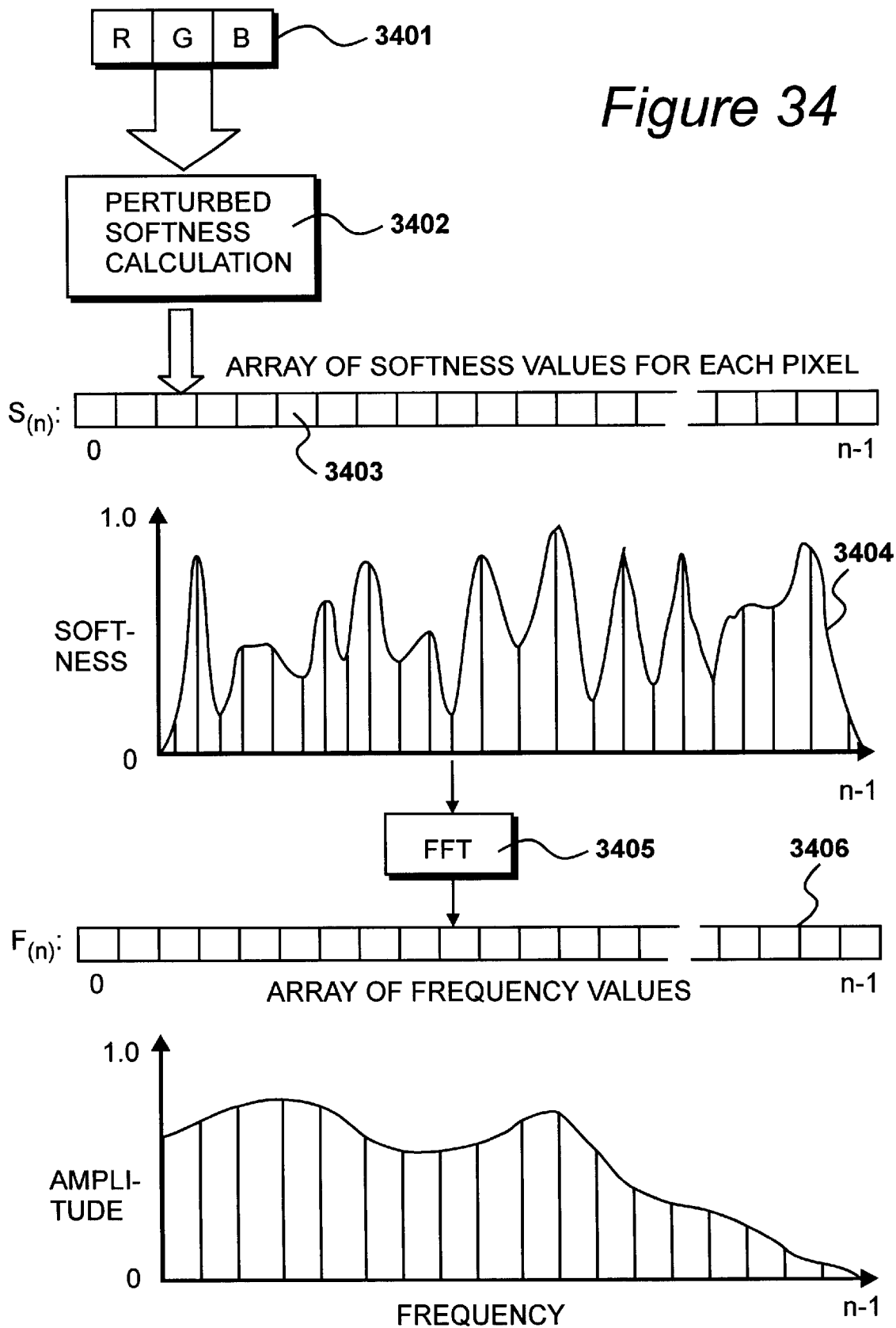
Figure 35:
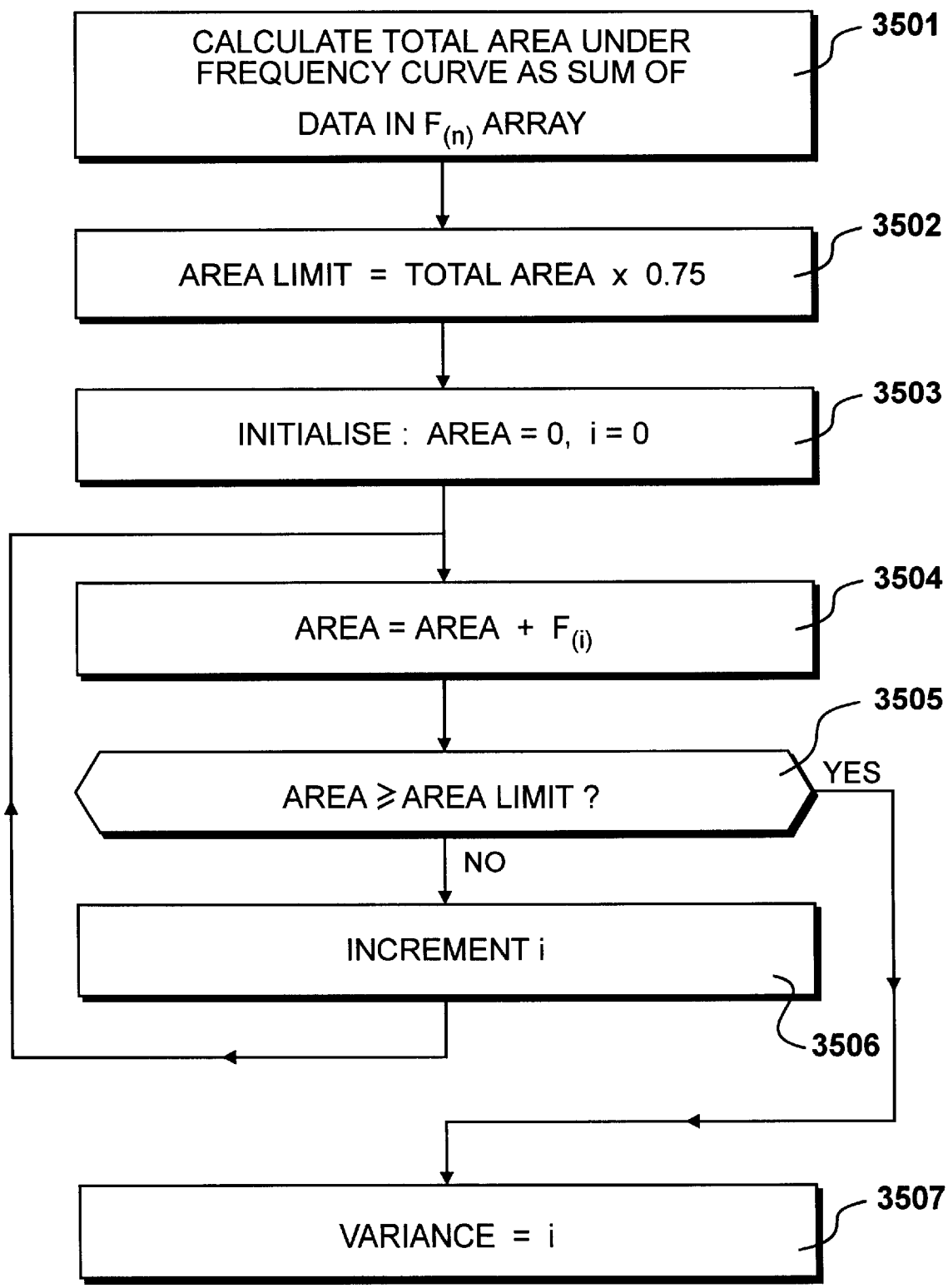
Figure 36:
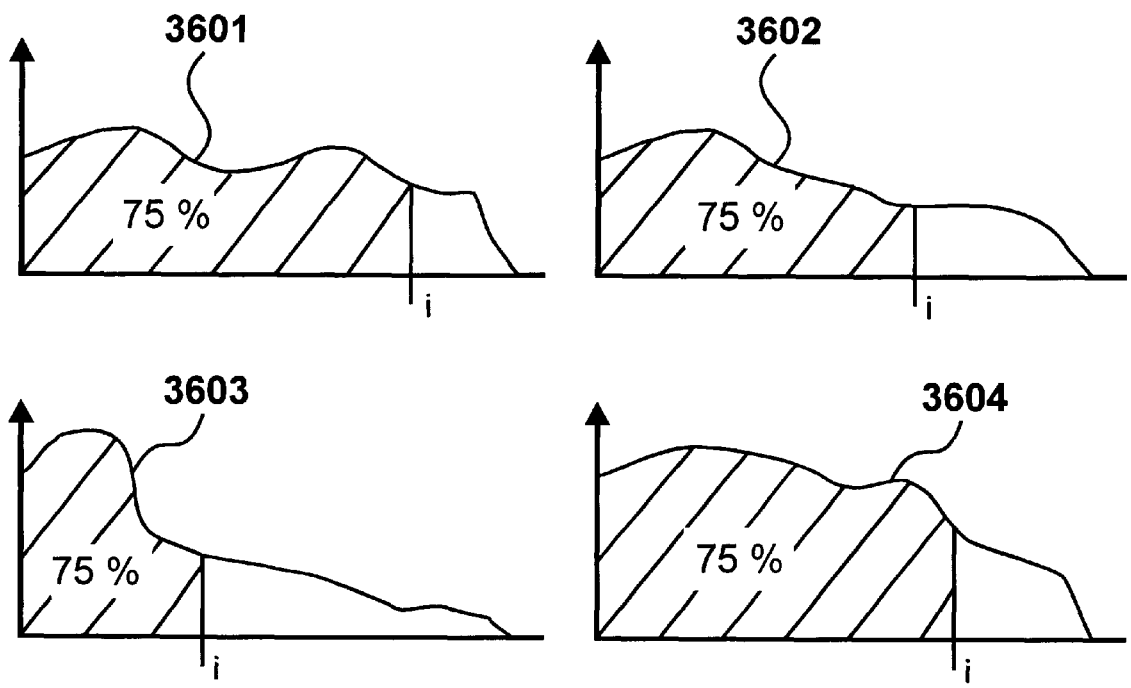

FIG. 13 details preliminary equations used to determine eigenvectors from the convex hull shown in FIG. 8;

FIG. 14 details additional equations including eigenvectors for determining a rotation matrix required to locate the cube as shown in FIG. 12;

FIG. 15 details a cross section of the cube shown in FIG. 12, including a cross section of a unit sphere and a pixel furthest away from the centre of the unit sphere;

FIG. 16 shows the expansion of the unit sphere to include all pixels shown in FIG. 15;

FIG. 17 details processes performed by the processing system shown in FIG. 1 in order to determine a scaling factor required to effect the unit sphere expansion shown in FIG. 16;

FIG. 18 illustrates the resulting three-dimensional tolerance ellipse when the unit sphere shown in FIG. 16 is viewed in RGB colour-space;

FIG. 19 illustrates the unit sphere in modified colour-space;

FIG. 20 details processes performed by the processing system to test whether a given pixel is located inside, outside or on the tolerance ellipse shown in FIG. 18;

FIG. 21 illustrates a softness ellipse for improving the quality of border and intermediate colour regions of a composited image, and the tolerance ellipse shown in FIG. 18;

FIG. 22 details a mathematical procedure for determining a softness value for colour co-ordinates of a pixel between the tolerance ellipse and softness ellipse shown in FIG. 21;

FIG. 23 details processes performed by the processing system to determine a control, matte, key or alpha value in response to a pixel RGB co-ordinate in colour-space containing the tolerance and softness ellipse shown in FIG. 21;

FIG. 24 illustrates pixel detail of foreground talent shown in FIG. 2;

FIGS. 25a and 25b illustrates a user-interactive display of the convex hull shown in FIG. 8;

FIGS. 26a through 26c illustrates user-interactive views of a control arrow on an ellipse of the type shown in FIG. 18;

FIGS. 27a and 27b illustrates the result of user manipulation of the control arrow and ellipse shown in FIG. 26;

FIG. 28 illustrates the result of a user-defined stretch function applied to an ellipse of the type shown in FIG. 18;

FIG. 29 shows a histogram display quantised by dividing each of the Red, Green and Blue axes into eight sections;

FIG. 30 shows a close-up of a texture that has been distorted due to a process of key extraction;

FIG. 31 shows a two-dimensional representation of colour-space;

FIG. 32 illustrates the selection of sets of scaling values to achieve a three-dimensional stretch of a softness ellipse;

FIG. 33 details processes performed in order to obtain optimal stretch factors;

FIG. 34 shows a graphical representation of processes identified in FIG. 33;

FIG. 35 identifies procedures performed in order to measure variance;

FIG. 36 shows four examples of frequency graphs; and

Figure 37:
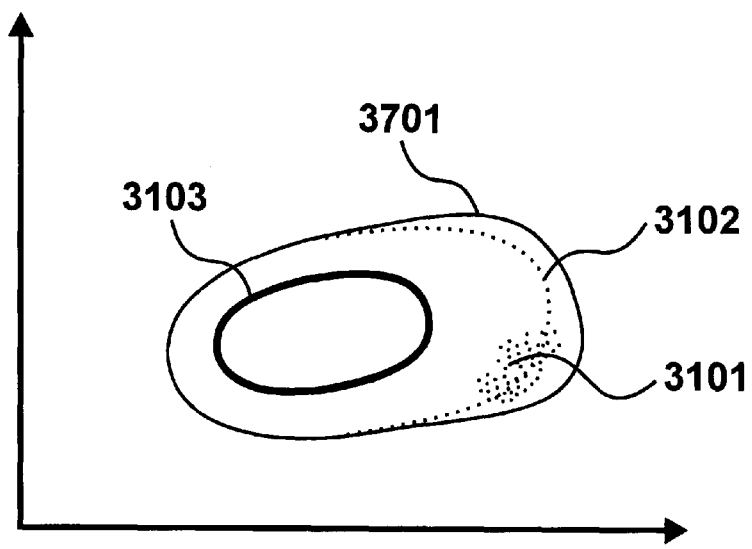

FIG. 37 shows the effect of stretching a softness ellipse.

DETAILED DESCRIPTION OF A PREFERRED EMBODIMENT

The invention will now be described by way of example only, with reference to the drawings identified above.

An image processing station is shown in FIG. 1, in which an image processing system 101 includes interface circuitry arranged to receive indications of the position of a user operated stylus 102 with respect to a position in two dimensions upon a graphics tablet 103. Video signals are supplied from the processing system 101 to a visual display unit 104. A keyboard 105 may be operated by the user in order to facilitate additional control operations. A high definition image recorder 106 supplies image data to the processing system 101, and may also receive processed image data back from the processing system 101. Image data may also be supplied to and from a data network.

By operating the stylus 102, or keyboard 105, the user may command the processing system 101 to perform a sequence of processing events for compositing frames of image data. An image clip consists of a sequence of frames, and each frame is considered as a two dimensional array of image pixels at a resolution appropriate to the destination medium. Thus, for image data that will be transferred to cinematographic film, a resolution of two thousand by two thousand pixels would be used. Each pixel in the image contains red, green and blue (RGB) components, thereby defining the luminance of each of the three primary colours for each pixel.

Operating instructions executable by the processing system 101 are received by means of a computer-readable medium such as a CD ROM 111 receivable within a CD ROM player 112.

In addition to displaying image frames, the monitor 104 also provides the user with a graphical user interface (GUI) such that various image processing commands may be activated by movement of a stylus-controlled cursor on the screen, in combination with pressing a button on the stylus, or appropriate commands, simultaneous or otherwise, from the keyboard 105. In this way a comprehensive image processing environment is provided, in which a user may perform image processing operations upon source image data, the results of which may be stored once the desired result has been achieved. In the environment shown in FIG. 1, the processing system is typically required to perform similar or identical image processing operations upon consecutive frames of image data. A group of consecutive frames is considered as a clip.

Compositing is a primary task of the image processing station shown in FIG. 1 Compositing involves the combination of images, one of which may represent a foreground, while another may represent a background. In order to combine the images automatically, it is necessary for the foreground image to include a background having clearly definable properties.

Typically, this means shooting the foreground against a blue background. An example of a foreground image shot in this way is shown in FIG. 2 The foreground talent 201, in this example a guitarist, is clearly visible against a blue background 206. The blue background is created in a studio by painted board covering the walls and floors and all other angles visible to the camera. Additional foreground items may be included such as a wine bottle 202, and a wine glass 203 upon a table 204.

Figure 3:
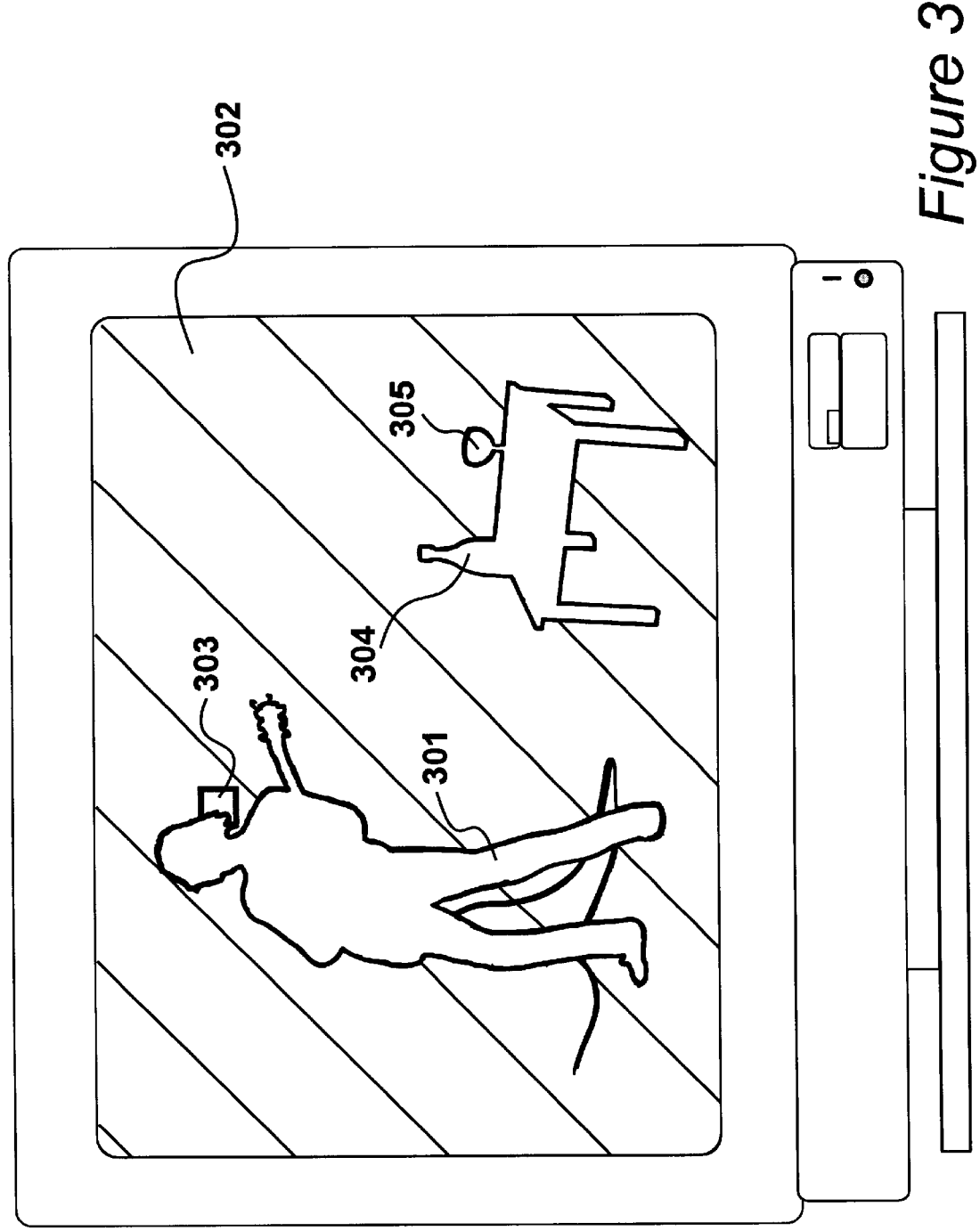
FIG. 3 illustrates a key, matte or alpha signal generated from the image shown in FIG. 2.

A process may be used to detect the blue colour in the foreground image in order to create a matte, in which all the blue is replaced by a pure black colour value, and all the foreground is replaced by a pure white colour value. A matte is not a collection of RGB pixels like the main image data, as each individual matte pixel only needs to be represented by a value of zero, for black, through to 1.0 for white. A matte resulting from the foreground image shown in FIG. 2 is shown in FIG. 3. The talent 201 has been replaced by a plain white silhouette 301 against a plain black background, represented by shading 302.

Generation of the matte shown in FIG. 3 is complicated by border regions. Clearly the border between the background and foreground images will not cross exact pixel boundaries and for this reason an intermediate region for the matte along a border is defined by intermediate matte pixel values between black and white, represented by values in the range between 0.0 and 1.0. It is difficult to define a clear linear transition at a border region because the precise variation in RGB values is complex; due in part to the natural variation in the precise colour of the blue sheet used as a background and also the possibility of a degree of blue component being included within valid parts of a foreground image. Even more difficult are translucent objects, such as the wine bottle 202 and glass 203.

Figure 4:
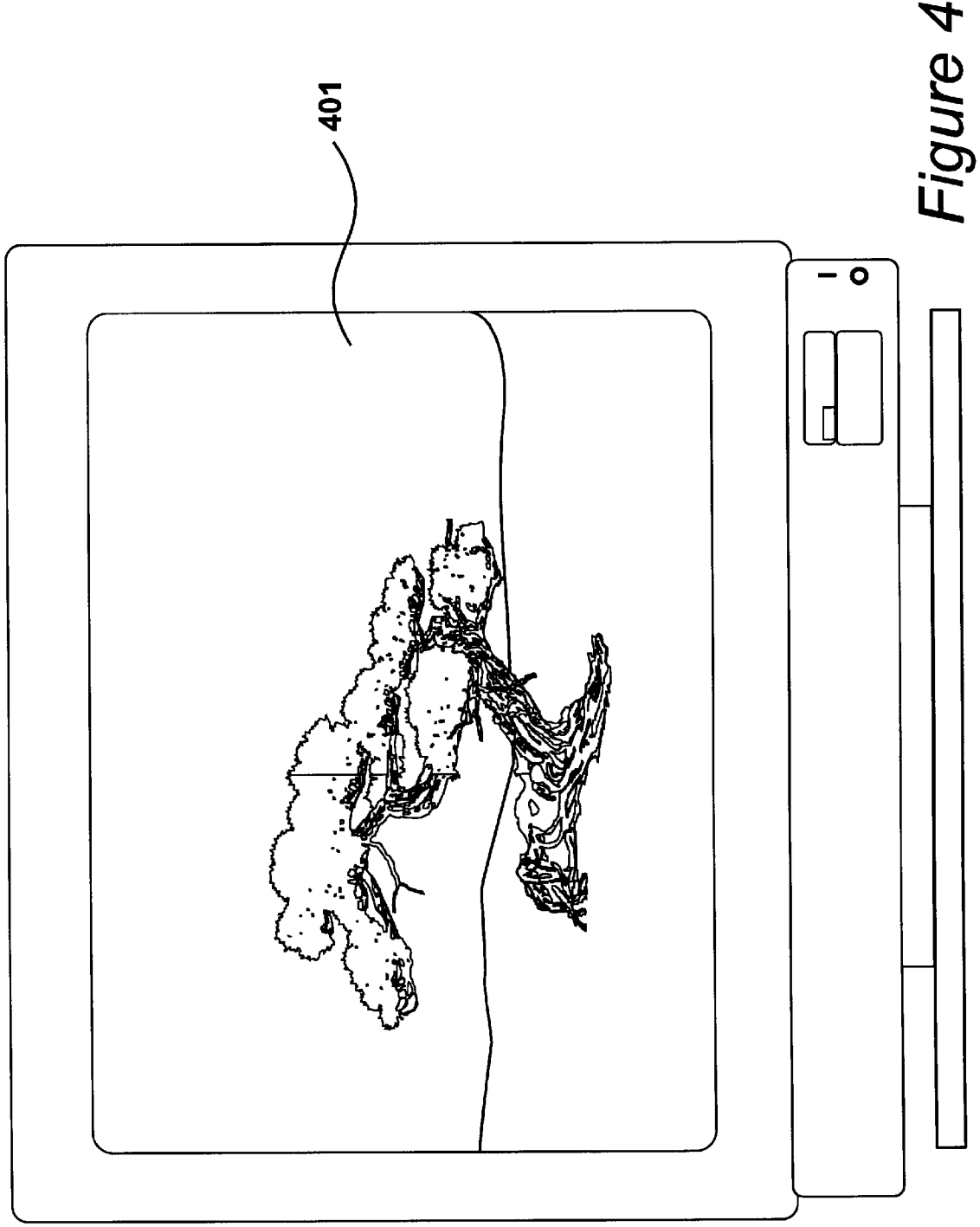
FIG. 4 illustrates a new background image, such that the foreground image shown in FIG. 2 will be composited against a new background image shown in FIG. 4 using the key signal illustrated in FIG. 3.

After a matte of the type shown in FIG. 3 has been generated from an image of the type shown FIG. 2, the matte may be used to combine the image shown in FIG. 2 against the new background, such as background 401 shown in FIG. 4.

Figure 5:
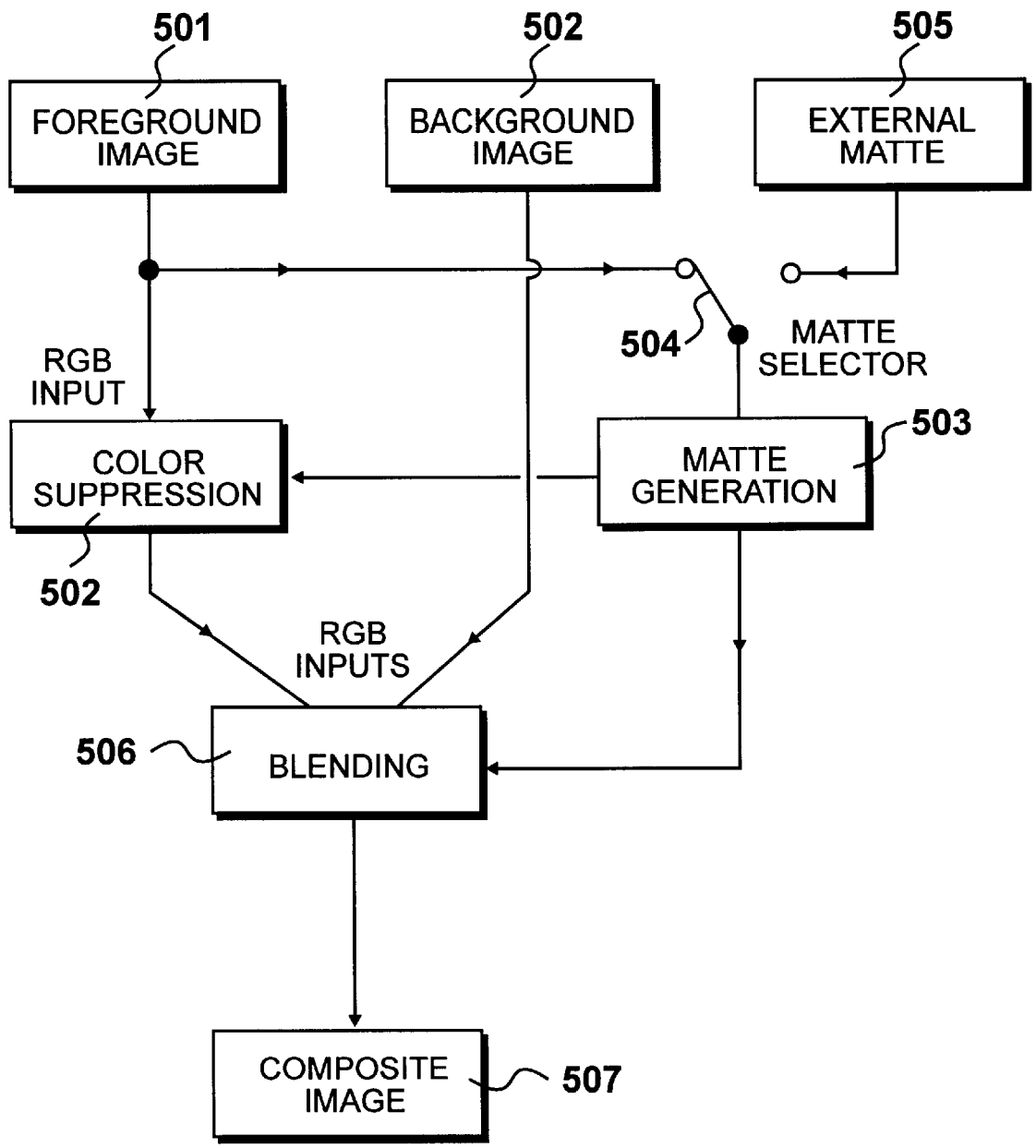
FIG. 5 illustrates a compositing process used for combining the foreground image of FIG. 1 against the background image of FIG. 4 by generating and using the key signal illustrated in FIG. 3, and which operates on the processing system shown in FIG. 1.

A summary of the processes performed by the processing system 101 is shown in FIG. 5. RGB pixel data for the foreground image 501 is supplied to a colour suppression process 502. When an image is shot against a blue background, bleeding occurs due to reflection of the blue light, and an unnatural predominance of blue can result. The colour suppression process 502 facilitates removal of such unwanted colour artefacts in the resulting image. The foreground image data 501 is also supplied to a matte generation process 503, which performs processing steps to generate matte pixel data, as indicated in FIG. 3. External matte data 505 may be selected via switch 504, if such data has already been prepared, for example, during a previous image processing session.

A blending process 506 receives colour-suppressed RGB foreground image pixel data, RGB background pixel data 508 and matte data. For each pixel in the matte a blend is performed, such that the proportion of each of the red, green and blue components in the foreground is proportional to the matte value, and the proportion of the red, green and blue components of the background is inversely proportional to the matte value. The resulting blended pixels form a composite image 507, which includes the foreground and the background in the required parts of the image.

The quality of the resulting composite image 507 is largely dependent upon the quality of the matte generation process 503. Problems arise in mapping an appropriate set of colours to the background, an appropriate set of colours to the foreground, and an intermediate set of colours which define a softness region between the two.

Figure 6:
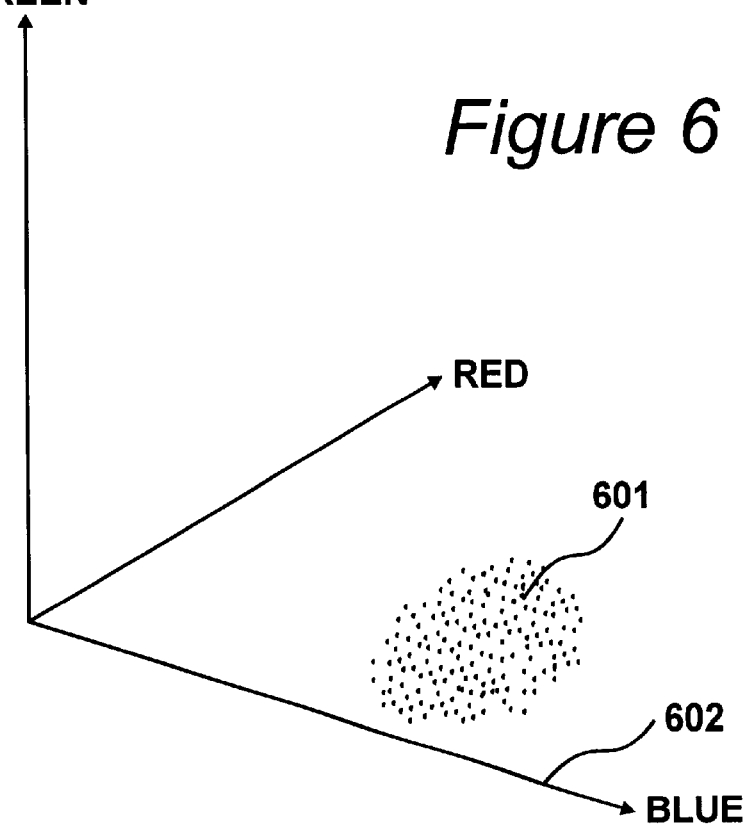
FIG. 6 illustrates pixels occupying in a volume of colour-space that represent a blue colour predominant in the foreground image shown in FIG. 2, and which is to be replaced by the background image shown in FIG. 4.

In accordance with procedures performed by the present embodiment, the background colour is considered as occupying a volume in colour-space. RGB colour-space is a volume having axes defined for the amplitudes of red, green and blue colour components. Thus, for a plurality of pixels whose RGB values are sampled from an area in an image of similar colour, such as the blue background, the pixels are displayed as occupying a particular volume of colour-space, as indicated in FIG. 6.

Image data, taking the form of a plurality of image pixels, is processed. The processing procedures are configured so as to provide signals to a visual display unit thereby displaying a three-dimensional representation of colour-space. Colour pixels forming an image are analysed and the analysed pixels are displayed at colour related positions within the displayed colour-space. Thus, a display is generated in which the geometric position of pixels relates to their colour only, with no bearing on their location within an original image frame.

A sample of blue pixels 601 is seen occupying a volume in colour-space, slightly away from the blue axis 602. A volume is defined by these pixels which includes all blue values that are valid for a corresponding matte area. Thus, by sampling background pixels, a region in colour-space is quickly defined which relates to the actual, rather than the intended, ideal blue value for the background which is to be replaced.

Figure 7:
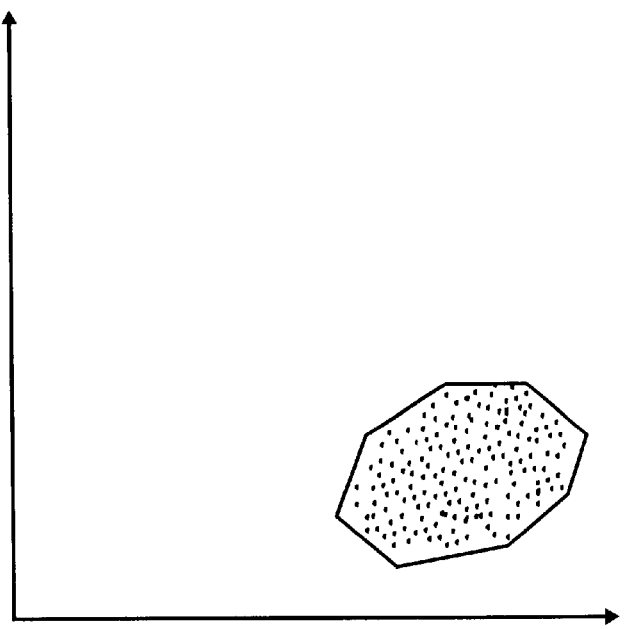
FIG. 7 illustrates a cross section of colour-space including the pixels identified in FIG. 6, including a line connecting the outermost of the identified pixels.

A minimal volume which includes all sampled pixels is defined by a three dimensional equivalent of applying a rubber band around all the points. This may be more easily understood by viewing the problem in two dimensions of colour-space, as shown in FIG. 7. Here, all the sampled pixel RGB values have been bounded by the shortest lines that connect all of the outermost pixels. The three dimensional equivalent of this is shown in FIG. 8, and comprises a number of surface planes connected to form a three dimensional convex hull 801. Convex hull calculation is performed by the known process of Delaunay Triangulation. This process is described in "The Computer Journal", Volume 24, Number 2, 1981 starting on page 167. The purpose of performing this operation is to define a set of pixels which lie on the surface of the bounding volume of the convex hull. Pixels inside the convex hull are superfluous to the next stages of calculation, and would result in excessive complication of the procedures to follow.

Thus the convex hull 801 shown in FIG. 8 is computed by Delaunay triangulation. Unfortunately, definition of the blue background colour in terms of this convex hull would result in excessive computation having to be performed by the processing system 101 when the matte definition is used. This is because, for each pixel in the foreground image, a decision must be made as to whether or not the RGB co-ordinates of that pixel cause it to be located within the convex hull or outside it. Because of the geometric complexity of the shape, this calculation would require a large number of processing steps. So, although a high quality of results would be obtained to define the matte, in the majority of applications this amount of processing time would be prohibitive. Thus it is necessary to define a simplified volume which contains all of the pixel points in RGB space defined by the data sample of the blue background.

The first step in this process of volume simplification is shown in FIG. 9. A rectangular volume 901 is shown, which fully encloses the convex hull 801 shown in FIG. 8. It is possible to define the centre of the rectangular box 901 using the equations shown in FIG. 10. The equations shown in FIG. 11 define scaling factors in each of the red, green and blue directions so as to normalise the rectangular box to a regular cube. A final-calculation is performed in order to determine a rotation transformation matrix, which when applied after the scaling process, results in the rectangular box 901 shown in FIG. 9 being rotated and normalised to the cube 1201 shown in FIG. 12, which then resides in a modified colour-space represented by CX, CY and CZ axes, 1202, 1203 and 1204 respectively.

The initial calculations required to determine the rotation are shown in FIG. 13. Essentially, the set of points on the surface of the convex hull 801, determined by the Delaunay Triangulation, are each analysed in turn in order to determine a matrix MC, shown in FIG. 14, from which eigenvectors u, v and w are calculated. The eigenvectors are then used to determine a rotation transformation matrix, which, when applied to a pixel's co-ordinates in colour-space, results in the desired rotation being achieved. This method is detailed in "Graphics Gems 3", pages 301 to 306, in the chapter "A Linear Time Simple Bounding Volume Algorithm", ISBN 0-12409671-9. Derivation of the eigenvectors is performed in accordance with the Jacobi Method, which is fully described in "Numerical Recipes in C", P463, published by Cambridge Press, ISBN 6-521-431-08-5. Derivation of the rotation from the set of data points on the surface of the convex hull results in a more accurate determination of the rotation than if all the pixels in the volume of the convex hull were used. Furthermore, the time taken to perform the calculations is considerably less.

The RGB values for the centre of the rectangular box 901, calculated as shown in FIG. 10, may be subtracted from colour-space pixel co-ordinates so that the rectangular box 901 is moved to a position where the centre of the box 901 coincides with the origin of the colour-space axes. This may also be considered as a translation of colour-space, if every pixel under consideration is modified in this way. Having moved the rectangular box 901 to the centre, it is then possible to perform the rotation using the eigenvectors obtained from the calculations shown in FIGS. 13 and 14. Finally, the scaling factors obtained by the calculations shown in FIG. 11 are applied to each pixel in colour-space, thereby resulting in the normalised cube 1201 shown in FIG. 12.

In summary, the three steps are: translation, rotation and scaling. Once modified in this way, colour-space co-ordinates no longer represent red, green and blue values, but instead represent an arbitrary set of orthogonal values created as a result of the pixel modifications outlined above. For convenience it is considered that the new colour-space is represented by CX, CY and CZ co-ordinates, which should not be confused with the x and y co-ordinate systems used for representing the physical location of an image frame.

The cube 1201 is unlikely to be a good approximation of the colour-space volume containing the sampled points. A typical cross section of the cube 1201 in two dimensions is shown in FIG. 15. Here it may be seen that the majority of pixels are likely to reside in a sphere, represented by a circle 1501 of unit radius 1502 surrounding the origin 1503. However, a few points will lie outside this sphere, and in order to determine the correct scaling value to create the unit sphere containing all points it is necessary to find the point 1504 that lies furthest away from the origin 1504. The CX, CY, CZ colour co-ordinates of this point may then be used to generate an additional scaling factor, thus enabling a unit sphere containing all points to be defined, as shown in FIG. 16. The furthest point 1504 from the origin is then located directly at the surface of the enlarged unit sphere 1601. All other points are then guaranteed to be contained within this three-dimensional unit sphere within colour-space.

The processing steps performed by the processing system 101 to obtain the modified scaling factors for the enlarged unit sphere are shown in FIG. 17. A temporary register location is considered as containing the value for the maximum size of vector connecting the origin to a point CX, CY, CZ in colour-space. At the start of the process, no points have been considered, and it is necessary to reset this register, denoted MAX_SIZE, to zero, as shown in process 1701. In process 1702, a pixel is selected from those which are located on the surface of the convex hull 801. It is not necessary to consider any other points located inside the convex hull for this process, as these will all have smaller vector magnitudes than those at nodes upon the surface of the convex hull. In process 1703, the three steps of translation, rotation and scaling are applied to the RGB values for the pixel, in order to translate them into CX, CY, CZ values for the next stage of the calculation.

In process 1704 the size of the vector in CX, CY, CZ space is calculated in accordance with the square root of the sum of the squares of each of the components. In process 1705, the size is compared with MAX_SIZE. If the size is greater than MAX_SIZE, as it will always be on the first iteration of this process, control is directed to process 1706, where the register containing the value MAX_SIZE is updated with the new value. Alternatively control is directed to process 1707, where a question is asked as to whether another pixel has yet to be analysed. If another pixel remains, control is directed back to process 1702, and the processes just described are repeated for the next pixel on the surface of the convex hull 801.

Alternatively, if all pixels have been considered, control is directed to process 1708, where a new scaling factor is calculated by dividing the previous scaling factor by MAX_SIZE. With this information it is now possible to define forward and backward transformation matrices mF and mB, such that any pixels colour co-ordinates may be translated between RGB colour-space and CX, CY, CZ colour-space. These transformation matrices are defined in process 1709.

The convex hull 801, shown in FIG. 8, is therefore carefully approximated by an ellipse, as shown in FIG. 18. For convenience, a three dimensional ellipse (an ellipsoid) will hereafter be referred to as an ellipse. By applying the forward transformation matrix mF, defined in process 1709, to the ellipse 1801 shown in FIG. 18, this shape is transformed into the unit sphere 1601 represented by the circle in FIG. 16, and the sphere shown in FIG. 19. The centre of the unit sphere 1601 coincides with the origin of the XYZ colour-space axes. This mF transformation matrix simplifies the process of finding out whether or not any arbitrarily chosen RGB pixel co-ordinates reside inside or outside the ellipse 1801.

The processes performed by the processing system 101 to determine whether a pixel is located inside or outside the ellipse 1801 are shown in FIG. 20. At process 2001 a point is selected, having red, green and blue co-ordinates, denoted Ri, Gi and Bi respectively. In process 2002, the co-ordinates are transformed by applying the forward transformation matrix mF, in order to obtain modified CX, CY, CZ colour-space coordinates, denoted Xi, Yi and Zi respectively.

In process 2003 the sum of the squares of Xi, Yi and Zi are calculated. The square root is not required, as the critical value is unity. Thus, if the sum of the squares is less than one, so will the square root of the sum of the squares be less than one. If the sum of the squares is greater than one, then so is the square root of the sum of the squares. Thus it is not necessary to perform a time-consuming square root calculation. This is the reason for scaling the sphere 1601 to a unit radius.

The result of process 2003 is one of three conditions. If the sum of the squares is greater than one, the point is outside the ellipse 1801, as shown at condition 2005. If the sum of the squares is less than one, the point is inside the ellipse, as represented by condition 2004. If the sum of the squares is exactly equal to 1, which is unlikely to happen, the point is on the ellipse surface, as represented by condition 2006.

With the sequence of processes shown in FIG. 20, it becomes easier to understand why an ellipse is a useful approximation to the convex hull 801. The ellipse may be translated, rotated and scaled to a unit sphere, which then has the key property of having a unit radius. The large number of pixels in an image frame may each be efficiently tested for inclusion or exclusion within the volume of colour-space bounded by the ellipse, by testing the colour vector of the pixel after the forward transformation matrix has been applied to its RGB values. The ellipse represents the closest possible ellipseal approximation to the convex hull 801, thereby representing a highly efficient compromise between speed and accuracy for applications such as compositing, where it is necessary to efficiently determine whether a pixel resides in the background colour volume.

In compositing, a strict binary decision as to whether a pixel is a foreground pixel or a background pixel would generate a considerable level of distortion in border regions, where a level of blending is required. The convex hull and the ellipse which are used to define the background colour volume are referred to herein as the tolerance hull and tolerance ellipse respectively. In order to define a blending process, a softness hull and a resulting softness ellipse are defined. Thus, in the same way that pixels representing absolute background colour values may be sampled and used to define the tolerance ellipse, pixels at border regions in the image, such as at the edges of foreground objects, such as the guitarist's hair 205, the translucent regions of the wine bottle 202 and the wine glass 203 may be sampled to define a larger volume of colour-space such that a softness ellipse can be determined. This ellipse is called a softness ellipse, because it enables the transition edges of the foreground and background images to be softened, thereby resulting in a more convincing composited image.

A tolerance ellipse is shown in two dimensional cross section in FIG. 21. The tolerance ellipse 1801 occupies a smaller volume of colour-space than the softness ellipse. The softness ellipse is determined from pixel samples in exactly the same way as for the tolerance ellipse. This results in a pair of forward transformation matrices: mFT and mFS, for the tolerance and softness ellipses respectively. It is then possible to determine whether any particular RGB value resides in any one of three spaces: inside the tolerance ellipse 1801, representing a background colour and a matte pixel value of 0.0, outside the softness ellipse 2101, representing a foreground colour, and a matte pixel value of 1.0, or in the volume between the tolerance and softness ellipses, corresponding to a matte pixel value or softness value of between 0.0 and 1.0.

The intermediate values are calculated by considering a vector 2102, which originates at the origin of the tolerance ellipse 1801 and which intersects the point 2104 under consideration. The distance of the point 2104 along this vector 2102 from the surface of the tolerance ellipse 1801 to the softness ellipse 2101, as a proportion of the total distance between the two ellipses at the point where they intersect this vector, determines the fractional softness value in the range 0.0 to 1.0. Thus a point 2103 close to the tolerance ellipse may have a softness value of 0.25. A point 2104 half way along the vector 2102 may have a softness value of 0.50, and a point 2105 close to the softness ellipse may have a softness value of 0.80.

A diagrammatic representation of the calculations required to determine the softness value of the point 2104 is shown in FIG. 22. The vector 2102, may have positions along its length considered as existing in tolerance colour-space, as defined by applying the tolerance transformation matrix mFT to these points. Alternatively, these same positions may be considered as existing in softness colour-space, as defined by applying the softness transformation matrix mFS to the positions.

Thus, given the RGB co-ordinates of the origin of the vector 2102, which is the centre 2201 of the tolerance ellipse 1801, these may be transformed by applying the softness transformation matrix mFS to give the co-ordinates of the origin in softness colour-space.

The point 2104 under consideration along the vector is also transformed in this way. The value w, of the distance of the point along this vector may be calculated according to the method described in "Graphics Gems 3", P275, "Intersecting a Ray with a Quadric Surface", ISBN 0-12-409671-9. The position 2202 along the vector 2102 that intersects the tolerance ellipse 1801 is unknown at this stage, but is given the value w/b, where w has just been found, but b is unknown. To determine the value of b, the RGB co-ordinates for the point are transformed from RGB space to tolerance space using the tolerance forward transformation matrix mFT. Then, the tolerance origin is simply (0,0,0), and the distance to the point 2104 along the vector 2102 may be calculated by the square root of the sum of the squares of CX CY and CZ, to give the value of b. The remaining equation in FIG. 22 enables the required softness value to be calculated.

The first graph shown in FIG. 22 represents the softness ellipse scale and the second graph represents the tolerance ellipse scale. The variable w may be considered as the white position in softness space and the variable b may be considered as the black position in tolerance space.

The processes performed by the processing system 101 to generate a matte pixel value between 0.0 and 1.0, from an individual RGB pixel value, are shown in FIG. 23. Other applications, other than compositing, may also use these processes, so the matte value is generalised to being a control value, which may be used in a variety of related operations. In process 2301, a question is asked as to whether the pixel RGB value is inside or on the tolerance ellipse. This is computed in accordance with the processes shown in FIG. 20. If the pixel is anywhere inside the tolerance ellipse, the control value is set to 0.0, as indicated at process 2302. Alternatively, if the pixel RGB value is outside the tolerance ellipse, control is directed to process 2303, where a question is asked as to whether the pixel resides outside or on the softness ellipse. Again, this condition is identified by performing the processes shown in FIG. 20.

If the pixel RGB value is anywhere outside the softness ellipse, the control value is set to 1.0, as indicated at process 2304. Alternatively, if the pixel RGB value is determined as lying inside the softness ellipse, it is understood that it must reside in the intermediate region between the tolerance and softness ellipses, and a softness value must be calculated. At process 2305 the softness value is calculated in accordance with the method outlined in FIG. 22, and this is used as the control value. Clearly more processing resources are required for pixels that lie between the softness and tolerance ellipses. Fortunately, however, this usually represents a small minority of the pixels in a typical frame, as most pixels will be either in the foreground or the background. For this reason the additional complexity required to calculate the softness does not usually result in significantly more processing resources being required.

The matte resulting from processing a portion 205 of the image shown in FIG. 2, containing a strand of the guitarist's hair, is detailed in FIG. 24. Here pixels are seen where the guitarist's hair crosses sub-pixel boundaries. The processes described above for identifying tolerance and softness ellipses in colour-space enables matte pixel values to be generated which are appropriate to the blending of foreground and background images in a way that provides a high degree of realism.

The present embodiment provides users with a way of manipulating colour-space ellipses directly by actually displaying a colour-space environment. Familiarity with the colour-space ellipses and their effect results in high quality compositing, and other effects, to be attained far more quickly than would otherwise be the case, because the user is able to interact directly with colour representations in a meaningful way. Thus, in addition to providing the user with a display of a foreground image, the resulting matte, and the composited image on the monitor 104, the processing system 101 also supplies signals to the monitor 104 such that various representations of colour-space objects can be shown, at the same time as the corresponding image. Thus effects resulting from a particular arrangement of objects in colour-space can be closely related to the composited image.

By providing a two dimensional projection of the three dimensional colour-space on the monitor 104, several colour-space objects may be viewed and subsequently manipulated. Fundamental to the process of compositing is the convex hull 801, which represents RGB values of sampled pixels. A displayed convex hull 801 is shown in FIG. 25A and FIG. 25B. In its first form, 801, a tessellated surface to the volume is shown, with each node 2501, 2502 corresponding to a pixel RGB value on the outside of the volume. In the second form the surface tessellations are not shown and are replaced by colour shaded surfaces having smooth transitions. The colour at any point on the surface is given by its actual points in RGB space. Thus a smooth colour variation across the surface of the volume gives a correct indication to the eye of the actual colours represented by the enclosed volume.

The colour at point 2504 on the surface of the convex hull 2503 has low values of red and green, but a medium value for blue. Thus this point is coloured in accordance with these respective proportions of colour, as a medium blue. Point 2505 contains higher values for red, green and blue, and is plotted as a higher brightness pixel, again with the proportions of colour being in accordance with its position relative to the RGB colour-space axes. Viewing options are provided by the processing system 101 such that the colour-space axes may be rotated, thus making it possible to view the convex hull from all sides, the particular view preferred being dependant upon the precise nature of the artefacts which the user is attempting to avoid in the final composited image.

Each component plane 2506 on the surface of the convex hull is considered as being related to three defining points at its three corners. Each of these points is determined by a pixel having an RGB value, which determines its colour and position in colour-space. For points across this triangular plane, the colour may be determined by linear interpolation in two dimensions between the three points. This type of shading is known as Gouraud shading and has an advantage in that many processing systems of the type indicated in FIG. 1 include specialised hardware for implementing this type of shading, thereby facilitating a high degree of processing efficiency.

In addition to displaying the convex hull, the processing system 101 may supply signals to the monitor 104 such that the ellipse approximation, used for calculations in colour-space, may also be displayed as a two dimensional projection of three dimensional colour-space. The ellipse may be shown as a wire-frame, as indicated in FIG. 18, or with Gouraud surface shading, to provide an intuitive link with the colours being represented.

When displayed as a wire-frame it becomes possible to superimpose the wire-frame ellipse upon the convex hull, thus enabling visualisation of the accuracy which this approximation represents. Using wire-frame projections of the ellipse permits both the tolerance and softness ellipse to be displayed simultaneously. The system processor allows the user to select which of the ellipses and convex hulls is displayed, and whether these should be in wire-frame or colour shaded solid form. Furthermore, the RGB axes of the colour-space projection on the monitor may be rotated so as to form a preferred view of the colour-space objects and thereby improve visualisation and identification of potential solutions to process artefact removal.

Once colour-space objects have been displayed in this way, it becomes possible, by appropriate user manipulation of the stylus 102, to modify these objects in order to improve the quality of the resulting composited image. Thus, instead of sampling pixels on the displayed image as described above, the user may modify the ellipses directly, using several types of three dimensional shape modifying tools.

Preparations for defining a three dimensional transformation are shown in FIG. 26. An ellipse 2601 is shown as a wire-frame model in a set of RGB axes generated by the processing system 101 and displayed on the monitor 401. A short control arrow 2602 is displayed, originating from the centre of the ellipse 2601. The arrow may be considered as having a constant length and may be rotated in any direction about the centre of the object to which it is attached. Thus the length and angle of the arrow indicates the direction in which a transformation is to be applied. The length of the arrow does not relate to the magnitude of the effect; this is merely a consequence of projecting its image onto the two dimensions of the screen of the monitor 104.

The position of the arrow may be adjusted by user manipulation of the stylus 102. Thus, the short arrow 2602 represents a transformation effect in a direction nearly perpendicular to the screen of the monitor 104. The long arrow 2603 represents a transformation effect in a direction largely parallel with the screen of the display monitor 104, and the short arrow 2604 represents a transformation effect away from the green axis, largely perpendicular to the screen.

FIG. 27 details two resulting transformations of the ellipse 2601 shown in FIG. 26. The enlarged ellipse 2701 results from a stretch operation carried out in accordance with the position of the control arrow 2604. The magnitude of the stretch may be determined by typing in a numerical value, such as 1.3, or by dragging the stylus 102, with the stylus button held down. An alternative result is represented by the rotated ellipse 2702. The rotation has been carried out with respect to the origin.

The result of a stretch operation is shown in FIG. 28. Thus the user has complete control over the shape of the three dimensional ellipse. The corresponding convex hull, to which the ellipse is an approximation, is automatically transformed in this way also, thus maintaining the mathematical relationship between the two.

In summary, there are six functional transformations of three dimensional colour-space objects that may be achieved by manipulation of the control arrow. These functions are:

F1—Translate in the direction of the arrow.

F2—Rotate

F3—Scale globally from the object's centre.

F4—Scale globally from the opposite edge.

F5—Proportional scaling or stretch from the object's centre.

F6—Proportional scaling from the opposite edge.

The function is selected by pressing and holding the appropriate function key on keyboard 105 while dragging the control arrow using the stylus 102.

In many instances it is useful to visualise the colour content of an entire image, or a sampled portion of an image. FIG. 29 shows a histogram display of colour-space in which the magnitude of pixels in a quantised region of colour-space is represented by a small histogram, also drawn in the average colour of that region of colour-space. The histogram is plotted in the three dimensions of colour-space at a co-ordinate representing the centre of the region that is being quantified. Thus, red, green and blue co-ordinates of pixels in an image determine three displayed characteristics: firstly the location of a histogram, secondly the colour of the histogram, and thirdly the height of the histogram.

The histogram display shown in FIG. 29 is quantised by dividing each of the red, green and blue axes into eight sections. The user may select different quantisations, such as sixteen, thirty-two or sixty-four, in order to represent the data most clearly. At a quantisation level of sixty-four, it is possible that the histogram display may become cluttered, or require a very high display definition to be understood clearly. Under some circumstances, however, even such a cluttered display will provide important information to the user about the colour content of an image frame.

The histogram is particularly useful for enabling the user to determine how well a tolerance or softness ellipse is likely to perform, as regions on the histogram display may clearly identify distinct regions for blue key colour as distinct from talent foreground colours. Also, places where differences are marginal will be clearly seen. The tolerance and softness ellipses may be superimposed upon the histogram display, so that an appropriate stretch or other transformation can be identified and applied to an ellipse, thereby improving the overall efficiency of the compositing process considerably.

A known problem with compositing is the adverse affect on texture which may occur in certain parts of the image. The original pixels of the surface of the wine bottle 202 shown in FIG. 2 have an overall smooth colour texture, but which is affected slightly by noise, due to the quality of the original image.

In the original image, as shown in FIG. 2, this low level of noise is acceptable. However, once the image is processed in a non-linear fashion to extract the matte, it is possible for the noise to become amplified in parts of the image where intermediate matte values are generated, thus resulting in clearly visible processing artefacts. Such effects are considered as adversely affecting the texture of an area of an image.

A close-up of a texture that has been distorted in this way is shown in FIG. 30. Adjacent pixels 3001 and 3002 have different colour values (shown as shading), the differences having been amplified by the process of compositing an area of the image containing a small amount of noise in an intermediate colour volume between the blue background and the foreground colours.

A two dimensional representation of three dimensional RGB colour-space is shown in FIG. 31. The pixels on the wine bottle 202 that result in the distorted texture shown in FIG. 30, are shown as a collection of points 3101, some of which are between the softness ellipse 3102 and the tolerance ellipse 3103, and some of which are outside the softness ellipse. Points inside the softness ellipse 3102 represent pixels that will be processed differently from points outside the softness ellipse 3102. This represents a non-linearity, and results in the amplification of noise, and the generation of visible texture distortion in the resulting composited image, as indicated in FIG. 30.

Other unwanted artefacts in the original image may be amplified in this way, including distortion artefacts from previous processing steps, including a previous iteration of a compositing procedure. The more heavily processed an image becomes, the more likely it is that distortion or noise artefacts will be revealed by a subsequent image processing step. Thus, minimising distortion is important if a particular special effect requires a sequence of image processes to be performed, as well as being important for the generation of a high quality image from a single stage image process.

In the present embodiment, the softness ellipse may be stretched to include the "cloud" of points 3101 that represent the pixels in the texture to be smoothed. The information shown in FIG. 31 is available to the user in the form of the three dimensional colour-space display shown in FIGS. 25 to 29, and the softness ellipse may be manipulated by a stretching function, as described. The problem of texture smoothing in a composited image is fairly common, and so it is preferable to avoid the need for manual identification and implementation of a solution in the form of modification of the softness ellipse, as this may take several minutes of a user's time, and will become tedious if the process has to be repeated frequently.

Instead of manually manipulating the softness ellipse 3102 shown in FIG. 31, it is possible to automatically perturb the softness ellipse with sets of scaling factors. For each set of scaling factors a smoothness measurement of the sampled pixels in the problem area is made. Out of the final set of smoothness measurements, the set of scaling factors for which the smoothness is greatest is selected and applied to modify the softness ellipse.

A set of ninety-four perturbation factors is used which are selected for an equal search of the problem space in three dimensions. The selection of sets of scaling values, to achieve a three dimensional stretch of the softness ellipse, is shown in FIG. 32. The first set of scaling factors 3201 comprises values of 1.0, 1.0 and 2.0, which are applied to the x, y and z axes of modified colour-space, in which the softness ellipse is a unit sphere around the origin. The second set of scaling factors is 1.2, 1.2 and 1.7. Thus the x, y and z scaling factors are not being incremented numerically, but geometrically. Thus the values may be considered as being selected to perform a search of a quadrant of a sphere 3203, the surface of which has equally spaced points, and the volume of which also contains equally spaced points. The points are equally spaced in three dimensions, such that the ninety-four points represent an equal search for an ideal stretch factor throughout the selected problem space.

The processes performed by the processing system 101 to obtain the optimal set of stretch factors, out of the ninety-four that are tested, are shown in FIG. 33. The processes shown are performed with respect to a set of pixels which have been identified as resulting in a rough texture in the composited image. This set of pixels may be sampled by identifying a rectangular region, within which all pixels are considered as samples, such as those indicated in FIG. 30.

In process 3301, a register containing a value for the minimum variance is set to an impossibly high value. At step 3302, a set of x, y and z perturbation factors is selected from a look-up table, as represented by the table shown in FIG. 32. In process 3303, each sampled pixel is processed to generate a softness value, thereby resulting in an array of softness values S(n) which has a number of entries (n) equal to the number of pixels in the sample shown in FIG. 30. In process 3304 this array of pixel softness values is processed by a single dimension fast Fourier transformation (FFT) to generate an array F(n) of frequency values, having the same number of entries (n) as the softness array S(n).

In process 3305, the frequency array F(n) is processed to generate a measurement of the variance, or roughness of the softness array S(n). In process 3306 a question is asked as to whether the variance just calculated is less than the minimum variance calculated so far. If not, control is directed to process 3308. Alternatively, control is directed to process 3307, where the minimum variance is updated with the variance calculated in process 3305, and the set of x, y and z perturbation factors, which resulted in that variance is recorded as the preferred set of perturbation factors.

Thereafter, control is directed to process 3308, where a question is asked as to whether all ninety-four sets of perturbation factors have been considered. If not, control is directed back to process 3302, where the next set of factors is selected. Alternatively, the sequence of processes is complete, and the values recorded in process 3307 are known to give the optimal stretch of the softness ellipse in order to smooth the texture represented by the sampled pixels shown in FIG. 30.

A graphical representation of processes 3303 and 3304 is shown in FIG. 34. Each pixel in the sampled area has its RGB components 3401 supplied to the softness calculation 3402 with the perturbed softness ellipse, to generate a value in the softness array S(n) 3403. The perturbed softness calculation is repeated for each pixel in the sample until the softness array S(n) 3403 is completely populated. The contents of this array may be visualised as a softness graph 3404, which shows the random noisy patternless character of the pixels. The softness array S(n) is supplied to a fast Fourier transform calculation 3405, to generate an array F(n) 3406 of frequency values. This set of frequency values may be visualised as a frequency graph 3407, in which the important characteristics of the smoothness are much more easily identifiable. A graph containing a relatively high frequency content contains more visible noise than a graph containing a relatively low frequency content.

If the area under the curve of the frequency graph 3407 is measured, then an expression of the roughness of the texture will be given by the point at which, moving from left to right along the frequency axis, seventy-five percent of the area under the frequency curve has been accounted for. This frequency value may then be used as an arbitrary unit of variance, used in process 3306 in FIG. 33, which can form the basis for comparing the success of each stretch of the softness ellipse.

Given that the area under the frequency curve 3407 is in the discrete time domain, the area is simply considered as being the sum of array values. The processes performed by the processing system 101 in process 3305 to obtain the measure of variance, are shown in FIG. 35. In process 3501 the total area under the frequency curve is calculated as being equal to the sum of the values stored in the frequency array F(n). In process 3502 an area limit is calculated as being equal to the total area multiplied by 0.75. In process 3503 an initialisation is performed by setting variables AREA and i to zero. In process 3504 the value for AREA is added to the contents of the location in the frequency array F(n) indexed by the variable i. In process 3505 a question is asked as to whether AREA is now greater than or equal to the area limit. If so, control is directed to process 3507. Alternatively control is directed to process 3506, where the variable i is incremented, so that the next value in the frequency array F(n) may be addressed. Control is then directed back to process 3504. At process 3507, analysis of the frequency array F(n) is complete, and the value of i, which was used to index the frequency array F(n) in process 3504, is used as an arbitrary measure of variance at process 3305 in FIG. 33.

Four sample graphs of frequency, out of the ninety four that are generated, are shown in FIG. 36. Here, the area under the frequency curve corresponding to the lowest seventy-five percent of the total area under each curve is shown shaded. Each graph corresponds to the frequency domain of the softness generated as a result of perturbing the softness ellipse 3120 shown in FIG. 31. In graph 3601, a relatively even frequency content is observed, with a high value of i. In graph 3602 a lower proportion of frequencies are observed, indicating a lower noise content. In graph 3603 a low frequency peak ensures a very low value for i, while at graph 3604 a higher value for i is observed. Out of these four graphs, 3601 to 3604, graph 3603 has the most predominant low frequencies, and so the perturbation factors which resulted in the generation of this graph would be preferable over those which generated the other graphs 3601, 3602 and 3604.

The result of identifying a preferred stretch of the softness ellipse is shown in FIG. 37. When the finalised x, y and z perturbation factors are applied to the softness ellipse 3102, the ellipse is stretched in three dimensions to an enlarged ellipse 3701, which now includes all the points 3101 corresponding to the pixels in the sampled area of texture, such as the translucent surface of the wine bottle 202 shown in FIG. 2.

I claim:

1. A method of processing image data representing a matte, key or control signal, comprising the steps of:

identifying a tolerance region in a colour-space matte, wherein the tolerance region comprises a first geometric shape that defines a background colour, and wherein said matte is for utilization in compositing video images;

identifying a transitional portion of said matte in which undesirable transitions occur in a form displayed as noise artifacts, and reducing the relative amplitudes of variations within said identified portion by modifying a softness region in said colour-space so as to reduce the presence of high frequency variations, wherein the softness region comprises a second geometric shape that defines a volume of said colour-space for the undesirable transitions, and wherein the softness region is modified by directly transforming the second geometric shape.

2. A method according to claim 1, wherein said matte is generated by a process of chroma-keying.

3. A method according to claim 1, comprising steps of perturbing the softness region iteratively, measuring frequency distributions and selecting a preferred perturbation.

4. A method according to claim 1, wherein frequency values are determined by performing a Fourier transform against softness values.

5. A method according to claim 1, wherein the second geometric shape of the softness region is an ellipsoid and the position of said softness region is modified by transforming the shapes of said ellipsoid.

6. A method according to claim 5, wherein a stretching operation is performed against said ellipsoid.

7. A method according to claim 5, wherein said ellipsoid is determined by defining a convex hull around a plurality of pixel colours defined in colour-space.

8. A method according to claim 5, wherein said ellipsoid is displayed to an operator.

9. A method according to claim 8, wherein the shape of said ellipsoid is modified in response to manual operation of an interface device.

10. Image data processing apparatus configured to process image data representing a matte, key or control signal, comprising first identifying means for identifying a tolerance region in a colour-space for said matte, wherein the tolerance region comprises a first geometric shape that defines a background color, and wherein said matte is for utilization in compositing video images;

second identifying means for identifying a transitional portion of said matte in which undesirable transitions occur in a form displayed as noise artefacts; and adjusting means configured to reduced the relative amplitudes of variations within said identified portion by modifying a softness region in said colour-space so as to reduce the presence of high frequency variations, wherein the softness region comprises a second geometric shape that defines a volume of said colour-shape for the undesirable transitions, and wherein the softness region is modified by directly transforming the second geometric shape.

11. Chroma-keying apparatus configured to composite image portions, including image data processing apparatus configured to process image data representing a key, according to claim 10.

12. Apparatus according to claim 10, wherein said adjusting means is configured to perturb the softness region iteratively, measure frequency distribution and select a preferred perturbation on the basis of said measurements.

13. Apparatus according to claim 10, including processing means configured to produce frequency values by performing a Fourier transform against softness values.

14. Apparatus according to claim 10, wherein said second geometric shape of the softness region is defined as an ellipsoid and the position of said softness region is modified by said adjusting means, configured to transform the shape of said ellipsoid.

15. Apparatus according to claim 14, wherein said adjusting means is configured to perform a stretch upon said ellipsoid.

16. Apparatus according to claim 14, including processing means configured to define a convex hull around a plurality of pixel colours defined in colour-space.

17. Apparatus according to claim 14, including display means for displaying an ellipsoid to an operator in colour-space.

18. Apparatus according to claim 17, wherein the shape of said displayed ellipsoid is modified in response to manual operation of a manually operable device.

19. A computer system programmed to process image data representing a matte, key or control signal, including the program steps of:

identifying a tolerance region in a colour-space for said matte, wherein the tolerance region comprises a first geometric shape that defines a background colour, and wherein said matte is for utilization in compositing video images;

identifying a transition portion of said matte in which undesirable transitions occur in a form displayable as noise artefacts; and reducing the relative amplitudes of variations within said identifies portion by modifying a softness region in said colour-space so as to reduce the presence of high frequency variations, wherein the softness region comprises a second geometric shape that defines a volume of said colour-space for the undesirable transitions, and wherein the softness region is modified by directly transforming the second geometric shape.

20. A computer system programmed according to claim 19, further programmed to process image data representing a key as part of a chroma-keying process.

21. A computer system programmed according to claim 19, further programmed to perturb the softness region iteratively, measure frequency distribution and select a preferred perturbation on the basis of said measurements.

22. A computer system programmed according to claim 19, further programmed to produce frequency values by performing a Fourier transform against softness values.

23. A computer system programmed according to claim 19, wherein the second geometric shape comprises an ellipsoid.

24. A computer system programmed according to claim 23, further programmed to perform a stretch upon said ellipsoid.

25. A computer system programmed according to claim 23, further programmed to define a convex hull around a plurality of pixel colours defined in colour-space.

26. A computer system programmed according to claim 23, further programmed to supply data to a display means thereby allowing said display means to display the ellipsoid to an operator in colour-space.

27. A computer system programmed according to claim 26, further programmed to respond to manual operation of a manually operable device so as to modify the shape of the displayed ellipsoid.

28. A computer-readable medium having computer-readable instructions executable by a computer, such that said computer performs the steps of:

identifying a tolerance region in a colour-space for said matte, wherein the tolerance region comprises a first geometric shape that defines a background colour, and wherein said matte is for utilization in comprising video image;

identifying a transitional portion of a matte, key or control signal in image data in which undesirable transitions occur in a form displayed as noise artefacts, and reducing the relative amplitudes of variations within said identified portion by modifying a softness region in said colour-space so as to reduce the presence of high frequency variations, wherein the softness region comprises a second geometric shape that defines a volume of said colour-space for the undesirable transitions, and wherein the softness region is modified by directly transforming the second geometric shape.

29. A computer-readable medium according to claim 28, having computer-readable instructions executed by a computer, such that said computer performs a further step of generating the matte by a chroma-keying process.

30. A Computer-readable medium according to claim 28, having computer-readable instructions executable by a computer, such that said computer performs a further step of perturbing the softness region iteratively, measuring frequency distributions and selecting a preferred perturbation.

31. A computer-readable medium according to claim 28, having computer-readable instructions executable by a computer, such that said computer performs the further step of determining frequency values by performing a Fourier transfer against softness values.

32. A computer-readable medium according to claim 28, wherein the second geometric shape is an ellipsoid.

33. A computer-readable medium according to claim 32, having computer-readable instructions executable by a computer, such that said computer performs a further step of performing a stretching operation against said ellipsoid.

34. A computer-readable medium according to claim 32, having computer-readable instructions executable by computer, such that said computer performs the further step of defining a convex hull around a plurality of pixel colours define in colour-space, so as to determine the position of the ellipsoid.

35. A computer-readable medium according to claim 32, having computer-readable instructions executable by a computer, such that said computer performs a further step of displaying the ellipsoid to an operator.

36. A computer-readable medium according to claim 35, having computer-readable instructions executable by a computer, such that said computer performs a further step of modifying said ellipsoid in response to manual operation of an interface device.

* * * * *

UNITED STATES PATENT AND TRADEMARK OFFICE
CERTIFICATE OF CORRECTION

PATENT NO. : 6,571,012 B1  Page 1 of 1
DATED : May 27, 2003
INVENTOR(S) : Daniel Pettigrew It is certified that error appears in the above-identified patent and that said Letters Patent is hereby corrected as shown below:

Drawings,
Fig. 5, Sheet 5, after "BACKGROUND IMAGE," "502" should read -- 508 --.
Fig. 25A, Sheet 20, first node "2502" should read -- 2501 --.
Fig. 34, Sheet 32, insert the frequency curve -- 3407- --.

Column 18,
Line 40, "identifies" should read -- identified --.
Line 61, "23" should read -- 19 --.

Column 19,
Line 13, "comprising," should read -- compositing- --.
Line 14, "image" should read -- images --.

Signed and Sealed this

Twenty-third Day of December, 2003

JAMES E. ROGAN
*Director of the United States Patent and Trademark Office*